United States Patent
Maurya et al.

(10) Patent No.: US 11,803,408 B2
(45) Date of Patent: Oct. 31, 2023

(54) DISTRIBUTED NETWORK PLUGIN AGENTS FOR CONTAINER NETWORKING

(71) Applicant: VMware, Inc., Palo Alto, CA (US)

(72) Inventors: Alok Kumar Maurya, Pune (IN); Nilesh Suryavanshi, Pune (IN); Kalyan Maddipatla, Pune (IN)

(73) Assignee: VMWARE, INC., Palo Alto, CA (US)

( * ) Notice: Subject to any disclaimer, the term of this patent is extended or adjusted under 35 U.S.C. 154(b) by 402 days.

(21) Appl. No.: 17/072,115

(22) Filed: Oct. 16, 2020

(65) Prior Publication Data

US 2022/0035651 A1 Feb. 3, 2022

(30) Foreign Application Priority Data

Jul. 29, 2020 (IN) .............................. 202041032515

(51) Int. Cl.
*G06F 9/455* (2018.01)
*G06F 9/54* (2006.01)

(52) U.S. Cl.
CPC .......... *G06F 9/45558* (2013.01); *G06F 9/542* (2013.01); *G06F 9/547* (2013.01); *G06F 2009/4557* (2013.01); *G06F 2009/45595* (2013.01)

(58) Field of Classification Search
CPC ............... G06F 2009/4557; G06F 2009/45595
See application file for complete search history.

(56) References Cited

U.S. PATENT DOCUMENTS

| 3,627,442 A | 12/1971 | Brandt et al. |
| 7,869,439 B1 | 1/2011 | Ramberg et al. |
| 7,890,543 B2 | 2/2011 | Hunt et al. |
| 7,912,955 B1 | 3/2011 | Machiraju et al. |

(Continued)

FOREIGN PATENT DOCUMENTS

| AU | 2004227600 B2 | 5/2009 |
| CA | 3107455 A1 | 2/2020 |

(Continued)

OTHER PUBLICATIONS

Author Unknown, "Advanced Networking Features in Kubernetes and Container Bare Metal," Document 606835-001, Dec. 2018, 42 pages, Intel Corporation.

(Continued)

*Primary Examiner* — Jacob D Dascomb
(74) *Attorney, Agent, or Firm* — ADELI LLP

(57) ABSTRACT

Some embodiments of the invention provide a method for connecting deployed machines in a set of one or more software-defined datacenters (SDDCs) to a virtual private cloud (VPC) in an availability zone (AZ). The method deploys network plugin agents (e.g. listening agents) on multiple host computers and configures the network plugin agents to receive notifications of events related to the deployment of network elements from a set of compute deployment agents executing on the particular deployed network plugin agent's host computer. The method, in some embodiments, is performed by a network manager that receives notifications from the deployed network plugin agents regarding events relating to the deployed machines and, in response to the received notifications, configures network elements to connect one or more sets of the deployed machines.

18 Claims, 16 Drawing Sheets

(56) References Cited

U.S. PATENT DOCUMENTS

| | | |
|---|---|---|
| 8,683,560 B1 | 3/2014 | Brooker et al. |
| 9,152,803 B2 | 10/2015 | Biswas et al. |
| 9,225,638 B2 | 12/2015 | Jain et al. |
| 9,258,312 B1 | 2/2016 | O'Neill et al. |
| 9,531,590 B2 | 12/2016 | Jain et al. |
| 9,536,077 B2 | 1/2017 | Bignon et al. |
| 9,590,901 B2 | 3/2017 | Tubaltsev et al. |
| 9,594,546 B1 | 3/2017 | Todd et al. |
| 9,674,275 B1 | 6/2017 | Engers et al. |
| 9,755,898 B2 | 9/2017 | Jain et al. |
| 9,774,537 B2 | 9/2017 | Jain et al. |
| 9,813,509 B1 | 11/2017 | Visser et al. |
| 9,825,810 B2 | 11/2017 | Jain et al. |
| 9,935,827 B2 | 4/2018 | Jain et al. |
| 9,979,641 B2 | 5/2018 | Jain et al. |
| 10,095,669 B1 | 10/2018 | Karppanen |
| 10,122,735 B1 | 11/2018 | Wohlgemuth |
| 10,129,077 B2 | 11/2018 | Jain et al. |
| 10,135,737 B2 | 11/2018 | Jain et al. |
| 10,193,977 B2 | 1/2019 | Ke et al. |
| 10,205,701 B1 | 2/2019 | Voss et al. |
| 10,225,137 B2 | 3/2019 | Jain et al. |
| 10,257,095 B2 | 4/2019 | Jain et al. |
| 10,270,796 B1 | 4/2019 | Veeraswamy et al. |
| 10,320,679 B2 | 6/2019 | Jain et al. |
| 10,341,233 B2 | 7/2019 | Jain et al. |
| 10,496,605 B2 | 12/2019 | Melnik et al. |
| 10,516,568 B2 | 12/2019 | Jain et al. |
| 10,547,521 B1 * | 1/2020 | Roy .................. H04L 41/0895 |
| 10,594,743 B2 | 3/2020 | Hong et al. |
| 10,609,091 B2 | 3/2020 | Hong et al. |
| 10,613,888 B1 | 4/2020 | Mentz et al. |
| 10,628,144 B2 | 4/2020 | Myneni et al. |
| 10,652,143 B2 | 5/2020 | Ravinoothala et al. |
| 10,693,782 B2 | 6/2020 | Jain et al. |
| 10,708,368 B1 | 7/2020 | Young et al. |
| 10,725,836 B2 | 7/2020 | Savenkov et al. |
| 10,795,909 B1 | 10/2020 | Bond et al. |
| 10,812,337 B2 | 10/2020 | Vaidya et al. |
| 10,841,226 B2 | 11/2020 | Mariappan et al. |
| 10,860,444 B2 | 12/2020 | Natanzon |
| 10,942,788 B2 | 3/2021 | Palavalli et al. |
| 10,944,691 B1 | 3/2021 | Raut et al. |
| 10,951,661 B1 | 3/2021 | Medan et al. |
| 10,972,341 B2 | 4/2021 | Mudigonda |
| 10,972,386 B2 | 4/2021 | Mackie et al. |
| 11,074,091 B1 | 7/2021 | Nayakbomman et al. |
| 11,086,700 B2 | 8/2021 | Myneni et al. |
| 11,159,366 B1 | 10/2021 | Gawade et al. |
| 11,190,491 B1 | 11/2021 | Kaciulis et al. |
| 11,194,483 B1 | 12/2021 | Dontu et al. |
| 11,277,309 B2 | 3/2022 | Vaidya et al. |
| 11,316,822 B1 | 4/2022 | Gawade et al. |
| 11,436,057 B2 | 9/2022 | Shen et al. |
| 11,500,688 B2 | 11/2022 | Liu et al. |
| 11,570,146 B2 | 1/2023 | Liu et al. |
| 11,606,254 B2 | 3/2023 | Liu et al. |
| 11,671,401 B2 | 6/2023 | Singh et al. |
| 2004/0098154 A1 | 5/2004 | McCarthy |
| 2005/0129019 A1 | 6/2005 | Cheriton |
| 2007/0244962 A1 | 10/2007 | Laadan et al. |
| 2010/0177674 A1 | 7/2010 | Aggarwal |
| 2010/0211815 A1 | 8/2010 | Mankovskii et al. |
| 2010/0246545 A1 | 9/2010 | Berzin |
| 2010/0293378 A1 | 11/2010 | Xiao et al. |
| 2011/0161988 A1 | 6/2011 | Kashyap |
| 2011/0194494 A1 | 8/2011 | Aso et al. |
| 2011/0282936 A1 | 11/2011 | Chekhanovskiy et al. |
| 2011/0289508 A1 | 11/2011 | Fell et al. |
| 2012/0117226 A1 | 5/2012 | Tanaka et al. |
| 2012/0150912 A1 | 6/2012 | Ripberger |
| 2012/0304275 A1 | 11/2012 | Ji et al. |
| 2013/0018994 A1 | 1/2013 | Flavel et al. |
| 2013/0019314 A1 | 1/2013 | Ji et al. |
| 2013/0125230 A1 | 5/2013 | Koponen et al. |
| 2013/0174168 A1 | 7/2013 | Abuelsaad et al. |
| 2013/0266019 A1 | 10/2013 | Qu et al. |
| 2013/0283339 A1 | 10/2013 | Biswas et al. |
| 2014/0036730 A1 | 2/2014 | Nellikar et al. |
| 2014/0129690 A1 | 5/2014 | Jaisinghani et al. |
| 2014/0164897 A1 | 6/2014 | Yucel et al. |
| 2014/0223556 A1 | 8/2014 | Bignon et al. |
| 2014/0237100 A1 | 8/2014 | Cohn et al. |
| 2014/0258479 A1 | 9/2014 | Tenginakai et al. |
| 2015/0063166 A1 | 3/2015 | Sif et al. |
| 2015/0081767 A1 | 3/2015 | Evens |
| 2015/0222598 A1 | 8/2015 | Koponen et al. |
| 2015/0249574 A1 | 9/2015 | Zhang |
| 2015/0263899 A1 | 9/2015 | Tubaltsev et al. |
| 2015/0263946 A1 | 9/2015 | Tubaltsev et al. |
| 2015/0317169 A1 | 11/2015 | Sinha et al. |
| 2015/0348044 A1 | 12/2015 | Smith |
| 2015/0379281 A1 | 12/2015 | Feroz et al. |
| 2016/0036860 A1 | 2/2016 | King et al. |
| 2016/0080422 A1 | 3/2016 | Belgodere et al. |
| 2016/0094454 A1 | 3/2016 | Jain et al. |
| 2016/0094457 A1 | 3/2016 | Jain et al. |
| 2016/0094650 A1 | 3/2016 | Rio |
| 2016/0094661 A1 | 3/2016 | Jain et al. |
| 2016/0217301 A1 | 7/2016 | Watanabe et al. |
| 2016/0241436 A1 | 8/2016 | Fourie et al. |
| 2016/0254964 A1 | 9/2016 | Benc |
| 2016/0269318 A1 | 9/2016 | Su et al. |
| 2016/0294612 A1 | 10/2016 | Ravinoothala et al. |
| 2016/0315809 A1 | 10/2016 | McMurry et al. |
| 2016/0335129 A1 | 11/2016 | Behera et al. |
| 2016/0337334 A1 | 11/2016 | Murr |
| 2017/0005923 A1 | 1/2017 | Babakian |
| 2017/0005986 A1 | 1/2017 | Bansal et al. |
| 2017/0031956 A1 | 2/2017 | Burk et al. |
| 2017/0063632 A1 | 3/2017 | Goliya et al. |
| 2017/0063782 A1 | 3/2017 | Jain et al. |
| 2017/0085561 A1 | 3/2017 | Han et al. |
| 2017/0093790 A1 | 3/2017 | Banerjee et al. |
| 2017/0171144 A1 | 6/2017 | Sagiraju et al. |
| 2017/0177394 A1 | 6/2017 | Barzik et al. |
| 2017/0195210 A1 | 7/2017 | Jacob et al. |
| 2017/0206034 A1 | 7/2017 | Fetik |
| 2017/0207963 A1 | 7/2017 | Mehta et al. |
| 2017/0286698 A1 | 10/2017 | Shetty et al. |
| 2017/0317954 A1 | 11/2017 | Masurekar et al. |
| 2017/0332307 A1 | 11/2017 | Pan |
| 2017/0353351 A1 | 12/2017 | Cheng et al. |
| 2017/0366416 A1 | 12/2017 | Beecham et al. |
| 2017/0374106 A1 | 12/2017 | Hamou et al. |
| 2018/0019969 A1 | 1/2018 | Murthy |
| 2018/0063194 A1 | 3/2018 | Vaidya et al. |
| 2018/0083835 A1 | 3/2018 | Cole et al. |
| 2018/0089299 A1 | 3/2018 | Collins et al. |
| 2018/0123943 A1 | 5/2018 | Lee et al. |
| 2018/0131675 A1 | 5/2018 | Sengupta et al. |
| 2018/0167453 A1 | 6/2018 | Luo |
| 2018/0167487 A1 | 6/2018 | Vyas et al. |
| 2018/0183757 A1 | 6/2018 | Gunda et al. |
| 2018/0205605 A1 | 7/2018 | Mittal et al. |
| 2018/0234459 A1 | 8/2018 | Kung et al. |
| 2018/0248827 A1 | 8/2018 | Scharber et al. |
| 2018/0262424 A1 | 9/2018 | Roeland et al. |
| 2018/0287996 A1 | 10/2018 | Tripathy et al. |
| 2018/0295036 A1 | 10/2018 | Krishnamurthy et al. |
| 2018/0331885 A1 | 11/2018 | Raymond et al. |
| 2018/0359323 A1 | 12/2018 | Madden |
| 2019/0034237 A1 | 1/2019 | Siddappa et al. |
| 2019/0036868 A1 | 1/2019 | Chandrashekhar et al. |
| 2019/0042518 A1 | 2/2019 | Marolia et al. |
| 2019/0068544 A1 | 2/2019 | Hao et al. |
| 2019/0079751 A1 | 3/2019 | Foskett et al. |
| 2019/0102280 A1 | 4/2019 | Caldato et al. |
| 2019/0103992 A1 | 4/2019 | Cidon et al. |
| 2019/0132220 A1 | 5/2019 | Boutros et al. |
| 2019/0132221 A1 | 5/2019 | Boutros et al. |
| 2019/0132283 A1 | 5/2019 | Ballard et al. |
| 2019/0140895 A1 | 5/2019 | Ennis, Jr. et al. |
| 2019/0140921 A1 | 5/2019 | Xu et al. |

(56) References Cited

U.S. PATENT DOCUMENTS

| | | | |
|---|---|---|---|
| 2019/0149512 A1 | 5/2019 | Sevinc et al. |
| 2019/0149516 A1 | 5/2019 | Rajahalme et al. |
| 2019/0149518 A1 | 5/2019 | Sevinc et al. |
| 2019/0171650 A1 | 6/2019 | Botev et al. |
| 2019/0173780 A1 | 6/2019 | Hira et al. |
| 2019/0229987 A1 | 7/2019 | Shelke et al. |
| 2019/0238363 A1 | 8/2019 | Boutros et al. |
| 2019/0238364 A1 | 8/2019 | Boutros et al. |
| 2019/0245757 A1 | 8/2019 | Meyer et al. |
| 2019/0273683 A1 | 9/2019 | Jiang et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0356693 A1 | 11/2019 | Cahana et al. |
| 2019/0384645 A1 | 12/2019 | Palavalli et al. |
| 2019/0386877 A1 | 12/2019 | Vaidya et al. |
| 2020/0065080 A1 | 2/2020 | Myneni et al. |
| 2020/0065166 A1 | 2/2020 | Myneni et al. |
| 2020/0073692 A1 | 3/2020 | Rao et al. |
| 2020/0076684 A1 | 3/2020 | Naveen et al. |
| 2020/0076685 A1 | 3/2020 | Vaidya et al. |
| 2020/0076734 A1 | 3/2020 | Naveen et al. |
| 2020/0092275 A1 | 3/2020 | Seed et al. |
| 2020/0112504 A1 | 4/2020 | Osman |
| 2020/0213366 A1 | 7/2020 | Hong et al. |
| 2020/0250009 A1 | 8/2020 | Jaeger et al. |
| 2020/0250074 A1 | 8/2020 | Zhang et al. |
| 2020/0252376 A1 | 8/2020 | Feng et al. |
| 2020/0301801 A1 | 9/2020 | Hegde |
| 2020/0314006 A1 | 10/2020 | Mackie et al. |
| 2020/0314173 A1 | 10/2020 | Pahwa et al. |
| 2020/0344120 A1 | 10/2020 | Pianigiani et al. |
| 2020/0366558 A1 | 11/2020 | Vaidya et al. |
| 2020/0374186 A1 | 11/2020 | Scott |
| 2020/0379812 A1 | 12/2020 | Ranjan et al. |
| 2020/0382556 A1 | 12/2020 | Woolward et al. |
| 2020/0401457 A1 | 12/2020 | Singhal et al. |
| 2020/0403853 A1 | 12/2020 | Garipally et al. |
| 2020/0403860 A1 | 12/2020 | Lewis et al. |
| 2020/0409671 A1 | 12/2020 | Mazurskiy |
| 2021/0004292 A1 | 1/2021 | Zlotnick et al. |
| 2021/0064442 A1* | 3/2021 | Alluboyina ........... G06F 9/5011 |
| 2021/0099335 A1 | 4/2021 | Li |
| 2021/0165695 A1 | 6/2021 | Palavalli et al. |
| 2021/0200814 A1 | 7/2021 | Tal et al. |
| 2021/0243164 A1 | 8/2021 | Murray et al. |
| 2021/0273946 A1 | 9/2021 | Iqbal et al. |
| 2021/0306285 A1 | 9/2021 | Hirasawa et al. |
| 2021/0311803 A1 | 10/2021 | Zhou et al. |
| 2021/0314190 A1 | 10/2021 | Liu et al. |
| 2021/0314239 A1 | 10/2021 | Shen et al. |
| 2021/0314240 A1 | 10/2021 | Liu et al. |
| 2021/0314300 A1 | 10/2021 | Shen et al. |
| 2021/0314361 A1 | 10/2021 | Zhou et al. |
| 2021/0314388 A1 | 10/2021 | Zhou et al. |
| 2021/0328858 A1 | 10/2021 | Asveren et al. |
| 2021/0349765 A1 | 11/2021 | Zhou et al. |
| 2021/0352044 A1 | 11/2021 | Asveren et al. |
| 2021/0365308 A1 | 11/2021 | Myneni et al. |
| 2021/0397466 A1 | 12/2021 | McKee et al. |
| 2021/0409336 A1 | 12/2021 | Talur et al. |
| 2022/0012045 A1 | 1/2022 | Rudraraju et al. |
| 2022/0038311 A1 | 2/2022 | Shen et al. |
| 2022/0070250 A1 | 3/2022 | Baid et al. |
| 2022/0158926 A1 | 5/2022 | Wennerström et al. |
| 2022/0182439 A1 | 6/2022 | Zhou et al. |
| 2022/0200865 A1 | 6/2022 | Vaidya et al. |
| 2022/0210113 A1 | 6/2022 | Pillareddy et al. |
| 2022/0278926 A1 | 9/2022 | Sharma et al. |
| 2022/0311738 A1 | 9/2022 | Singh et al. |
| 2022/0321495 A1 | 10/2022 | Liu et al. |
| 2022/0400053 A1 | 12/2022 | Liu et al. |
| 2023/0070224 A1 | 3/2023 | Huo et al. |

FOREIGN PATENT DOCUMENTS

| | | |
|---|---|---|
| CN | 105897946 A | 8/2016 |
| CN | 106789367 A | 5/2017 |
| CN | 107947961 A | 4/2018 |
| CN | 108809722 A | 11/2018 |
| CN | 110531987 A | 12/2019 |
| CN | 110611588 A | 12/2019 |
| CN | 111327640 A | 6/2020 |
| CN | 111371627 A | 7/2020 |
| CN | 111865643 A | 10/2020 |
| CN | 113141386 A | 7/2021 |
| EP | 2464151 A2 | 6/2012 |
| EP | 2464152 A2 | 6/2012 |
| EP | 3316532 A1 | 5/2018 |
| EP | 3617879 A1 | 3/2020 |
| EP | 4078369 A1 | 10/2022 |
| JP | 2011070707 A | 4/2011 |
| JP | 2012099048 A | 5/2012 |
| JP | 2018523932 A | 8/2018 |
| WO | 2011159842 A2 | 12/2011 |
| WO | 2016160523 A1 | 10/2016 |
| WO | 2018044352 A1 | 3/2018 |
| WO | 2019241086 A1 | 12/2019 |
| WO | 2020041073 A1 | 2/2020 |
| WO | 2021196080 A1 | 10/2021 |
| WO | 2022026028 A1 | 2/2022 |
| WO | 2022204941 A9 | 10/2022 |

OTHER PUBLICATIONS

Author Unknown, "Chapter 4: Default Security Policy," IBM Security Access Manager Version 9.0, Oct. 2015, 18 pages.

Author Unknown, "Containers and Container Networking for Network Engineers: VMware NSX Container Networking," Jan. 2018, 58 pages, VMware, Inc.

Balla, David, et al., "Adaptive Scaling of Kubernetes Pods," NOMS 2020—2020 IEEE/IFIP Network Operations and Management Symposium, Apr. 20-24, 2020, 5 pages, IEEE, Budapest, Hungary.

Non-Published Commonly Owned Related International Patent Application PCT/US2021/031644 with similar specification, filed May 10, 2021, 49 pages, VMware, Inc.

Non-published Commonly Owned U.S. Appl. No. 17/176,191 (E511.C1), filed Feb. 16, 2021, 36 pages, VMware, Inc.

Qi, Shixiong, et al., "Assessing Container Network Interface Plugins: Functionality, Performance, and Scalability," IEEE Transactions on Network and Service Management, Mar. 2021, 16 pages, vol. 198, No. 1, IEEE.

Abhashkumar, Anubhavnidhi, et al., "Supporting Diverse Dynamic Intent-based Policies Using Janus," CoNEXT 17, Dec. 12-15, 2017, 14 pages, ACM, Incheon, KR.

Abwnawar, Nasser, "A Policy-Based Management Approach to Security in Cloud Systems," Feb. 2020, 184 pages, De Monfort University, Leicester, UK.

Non-Published Commonly Owned U.S. Appl. No. 17/692,634 (E448.C2), filed Mar. 11, 2022, 42 pages, VMware, Inc.

Author Unknown, "E-Security Begins with Sound Security Policies," Jun. 14, 2001, 23 pages, Symantec Corporation.

Darabseh, Ala, et al., "SDDC: A Software Defined Datacenter Experimental Framework," Proceedings of the 2015 3rd International Conference on Future Internet of Things and Cloud, Aug. 24-26, 2015, 6 pages, IEEE Computer Society, Washington, D.C., USA.

Non-published Commonly Owned U.S. Appl. No. 16/897,627, filed Jun. 10, 2020, 85 pages, VMware, Inc.

Non-published Commonly Owned U.S. Appl. No. 16/897,640, filed Jun. 10, 2020, 84 pages, VMware, Inc.

Non-published Commonly Owned U.S. Appl. No. 16/897,652, filed Jun. 10, 2020, 84 pages, VMware, Inc.

Non-published Commonly Owned U.S. Appl. No. 16/897,666, filed Jun. 10, 2020, 78 pages, VMware, Inc.

Non-published Commonly Owned U.S. Appl. No. 16/897,680, filed Jun. 10, 2020, 78 pages, VMware, Inc.

(56) References Cited

OTHER PUBLICATIONS

Non-published Commonly Owned U.S. Appl. No. 16/897,695, filed Jun. 10, 2020, 77 pages, VMware, Inc.
Non-published Commonly Owned U.S. Appl. No. 16/897,704, filed Jun. 10, 2020, 85 pages, VMware, Inc.
Non-published Commonly Owned U.S. Appl. No. 16/897,715, filed Jun. 10, 2020, 70 pages, VMware, Inc.
Rouse, Margaret, "What is SDDC (software-defined data center)?—Definition from WhatIs.com," Mar. 2017, 5 pages, TechTarget.com.
Author Unknown, "OpenShift Container Platform 4.6," Mar. 3, 2021, 41 pages, Red Hat, Inc.
Author Unknown, "Kubernetes Core Concepts for Azure Kubernetes Service (AKS)", Jun. 3, 2019, 6 pages, retrieved from https://docs.microsoft.com/en-us/azure/aks/concepts-clusters-workloads.
Chawla, Harsh, et al., "Building Microservices Applications on Microsoft Azure: Designing, Developing, Deploying, and Monitoring," Month Unknown 2019, 271 pages, Harsh Chawla and Hemant Kathuria, India.
PCT International Search Report and Written Opinion of Commonly Owned International Patent Application PCT/US2021/031644, dated Jul. 26, 2021, 13 pages, International Searching Authority (EPO).
Sayfan, Gigi, "Mastering Kubernetes: Automating container deployment and management," May 2017, 426 pages, Packt Publishing, Birmingham, UK.
Wodicka, Brent, "A Developer's Guide to Container Orchestration, Kubernetes, & AKS," Mar. 19, 2019, 5 pages, AIS, Reston, VA, USA.
Author Unknown, "NSX vSphere API Guide—NSX 6.2 for vSphere," Jan. 6, 2017, 400 pages, VMware, Inc.

\* cited by examiner

Operation-1: Worker Nodes (WNs) deployed for K8s cluster-1 on Node 1 and Node 3

| Time | Node 1 |  |  | Node 2 |  |  |  | Node 3 |  |  |
|---|---|---|---|---|---|---|---|---|---|---|
|  | LA1 | DNPA1 (Active) | CMP1 (K8s-1) | PMP1 | LA2 | DNPA2 | CMP2 | PMP2 | LA3 | DNPA3 | CMP3 (K8s-2) | PMP3 |

| Time | LA1 | DNPA1 (Active) | CMP1 (K8s-1) | PMP1 | LA2 | DNPA2 | CMP2 | PMP2 | LA3 | DNPA3 | CMP3 (K8s-2) | PMP3 |
|---|---|---|---|---|---|---|---|---|---|---|---|---|
| T0 | LA gets event and forwards K8s-cluster-1 info to Active DNPA1 | No Action | No Action | No Action | No Action | No Action | No Action | No Action | LA gets event and forwards K8s-cluster-1 info to Active DNPA1 | No Action | No Action | No Action |
| T1 | No Action | Choose CMP1 as master for K8s-cluster-1 | No Action | No Action | No Action | No Action | No Action | No Action | No Action | No Action | No Action | No Action |
| T2 | No Action | DNPA1 Broadcast msg. to all DNPAs IDing CMP1 as Master for K8s-cluster-1 | Cluster Mgr. for K8s-cluster-1 | No Action | No Action | Receive Broadcast msg. and add in cluster-info | No Action | No Action | No Action | Receive Broadcast msg. and add in cluster-info | No Action | No Action |

*Figure 10A*

| Time | Node 1 | | | | Node 2 | | | | Node 3 | | | |
|---|---|---|---|---|---|---|---|---|---|---|---|---|
| | LA1 | DNPA1 (Active) | CMP1 (K8s-1) | PMP1 | LA2 | DNPA2 | CMP2 | PMP2 | LA3 | DNPA3 | CMP3 (K8s-2) | PMP3 |
| Operation-2: Worker Nodes (WNs) deployed for K8s cluster-2 on Node 2 and Node 3 ||||||||||||
| T3 _1014_ | No Action | No Action | No Action | No Action | LA get event and forwards K8s-cluster-2 info to Active DNPA1 | No Action | No Action | No Action | LA getevent and forwards K8s-cluster-2 info to Active DNPA1 | No Action | No Action | No Action |
| T4 _1015_ | No Action | Choose CMP3 as master for K8s-cluster-2 | No Action | No Action | No Action | No Action | No Action | No Action | No Action | No Action | No Action | No Action |
| T5 _1016_ | No Action | DNPA1 Broadcast msg. to all DNPAs IDing CMP3 as Master for K8s-cluster-2 | No Action | No Action | No Action | Receive Broadcast msg. and add in cluster-info | No Action | No Action | No Action | Receive Broadcast msg. and add in cluster-info | Cluster Mgr. for K8s-cluster-2 | No Action |

*Figure 10B*

| Time | Node 1 | | | | Node 2 | | | | Node 3 | | | |
|---|---|---|---|---|---|---|---|---|---|---|---|---|
| | LA1 | DNPA1 (Active) | CMP1 (K8s-1) | PMP1 | LA2 | DNPA2 | CMP2 | PMP2 | LA3 | DNPA3 | CMP3 (K8s-2) | PMP3 |
| T6 | LA gets NS creation event and Request added in Queue | No Action | No Action | No Action | No Action | No Action | No Action | No Action | No Action | No Action | No Action | No Action |
| Operation-3: Create NS for K8s cluster-1 ||||||||||||
| T7 | No Action | No Action | Process NS creation request | No Action | No Action | No Action | No Action | No Action | LA get NS creation event and Request gets rejected | No Action | No Action | No Action |

*Figure 10C*

| Time | Node 1 | | | | Node 2 | | | | Node 3 | | | |
|---|---|---|---|---|---|---|---|---|---|---|---|---|
| | LA1 | DNPA1 (Active) | CMP1 (K8s-1) | PMP1 | LA2 | DNPA2 | CMP2 | PMP2 | LA3 | DNPA3 | CMP3 (K8s-2) | PMP3 |
| | | | Operation-4: Create 2 PODs for K8s cluster-1 assuming POD1 scheduled on WN1 and POD2 scheduled on WN2 | | | | | | | | | |
| T8 | LA get POD1 creation event and Request added in Queue | No Action | No Action | No Action | No Action | No Action | No Action | No Action | No Action | No Action | No Action | No Action |
| T9 | No Action | No Action | No Action | Process POD creation request | No Action | No Action | No Action | No Action | LA get POD2 creation event and Request added in Queue | No Action | No Action | Process POD creation request |

*Figure 10D*

DISTRIBUTED NETWORK PLUGIN AGENTS FOR CONTAINER NETWORKING

BACKGROUND

With the recent increase in cloud native applications, today there is more demand than ever for fast deployment of on-demand networking for connecting machines that are deployed in software-defined datacenters (SDDC). With the increased number of compute clusters, each interacting independently with a network manager of a SDDC, the network manager is subject to being overwhelmed by requests from the compute clusters to connect machines that are deployed in the SDDC. Accordingly, it is desirable to provide a solution that allows compute clusters to communicate with the network manager of the SDDC without overwhelming the network manager.

BRIEF SUMMARY

Some embodiments of the invention provide a method for connecting deployed machines in a set of one or more software-defined datacenters (SDDCs) to a virtual private cloud (VPC) in an availability zone (AZ). The method deploys network plugin agents (e.g. listening plugins) on multiple host computers and configures the network plugin agents to receive notifications of events related to the deployment of network elements from a set of compute deployment agents executing on the particular deployed network plugin agent's host computer. The method, in some embodiments, is performed by a network manager that receives notifications from the deployed network plugin agents regarding events relating to the deployed machines and, in response to the received notifications, configures network elements to connect one or more sets of the deployed machines. In some embodiments, the network manager is a network manager of a VPC in the AZ.

In some embodiments, configuring the network plugin agents to receive notifications includes registering the network plugin agents with an API (Application Programming Interface) processor that receives intent-based API requests, and parses these API requests to identify (1) a set of machines to deploy and/or modify in the set of machines, (2) a set of network elements to connect to the set of machines, or (3) a set of service machines to perform services for the set of machines. In some embodiments, the API is a hierarchical document that can specify multiple different compute and/or network elements at different levels of a compute and/or network element hierarchy.

The API requests, in some embodiments, include requests to add a machine, to remove a machine, or to modify a deployed machine. In some embodiments, the machines are containers or pods of a Kubernetes deployment. The machines, in some embodiments, are connected to the VPC by the network manager by assigning a set of network addresses (e.g., IP (internet protocol) addresses, MAC (media access control) addresses, ports, etc.) to the machines and updating a set of network elements (e.g. forwarding elements) of the VPC to use at least one network address in the set of network addresses to connect to the machines.

Network plugin agents, in some embodiments, register with compute deployment agents executing on multiple host computers to receive notifications over a hyperbus. In some embodiments, in which network plugin agents receive notifications from compute deployment agents on other host computers, the hyperbus is a logical network spanning the multiple host computers that is dedicated to data messages (i.e., registration and notification messages) exchanged between network plugin agents and compute deployment agents. In some embodiments, the compute deployment agents execute on a set of master worker nodes (e.g., virtual machines) of a corresponding set of Kubernetes worker node clusters (e.g., compute clusters including the master and worker nodes) that have worker nodes executing on the multiple host computers. The set of master worker nodes, in some embodiments, monitors other worker nodes in the Kubernetes worker node cluster to detect failures of components of the Kubernetes worker node clusters. When a master worker node detects a failure, in some embodiments, the master worker node generates a request to deploy a replacement for the failed component.

In some embodiments, the network plugin agents receive notifications from a set of worker nodes executing on a same host computer through a hyperbus of the host computer. Each worker node, in some embodiments, executes a notification agent to notify the network plugin agents of events relating to the deployment of machines on the worker node such that the hyperbus is limited to the host computer. The notification agent, in some embodiments, forwards CRUD (Create, Read, Update and Delete) requests received at the worker node to deploy machines (e.g., containers, pods, applications, etc.) to the network plugin agent. In some embodiments, in which each worker node executes a notification agent, the hyperbus is a logical network spanning only a single host computer that connects the worker nodes and the network plugin agents executing on the host computer.

The network plugin agent, in some embodiments, is an instance of a distributed network plugin agent (DNPA). A DNPA, in some embodiments, includes (1) a listening plugin that receives the notifications from the compute deployment agents, (2) a request queue for storing requests related to notifications received by the network plugin agent, (3) a cluster manager plugin (CMP) that processes requests relating to cluster-level requests stored in the request queue, (4) a pod manager plugin (PMP) that processes requests related to pod-level requests relating to worker nodes executing on the host computer that are stored in the request queue, and (5) a communication agent that communicates requests processed by the cluster manager plugin and pod manager plugin to the network manager, wherein the network manager configures the network elements in the availability zone based on the requests processed by the cluster manager and pod manager.

In some embodiments, a particular DNPA instance is selected as a master DNPA instance for the DNPA. In order to ensure that the network manager is not overwhelmed by requests from the multiple DNPA instances, the master DNPA instance receives data regarding a number of pending requests stored in request queues associated with the DNPA instances executing on each of the plurality of host computers. The master DNPA instance determines the total number of pending requests related to the deployment of machines and a maximum rate for processing requests at the network manager. Based on the data regarding the number of pending requests and the determined maximum rate for processing requests at the network manager, the master DNPA instance calculates, for each DNPA instance executing on the multiple host computers, a rate limit specifying a rate at which the DNPA instance is allowed to communicate requests related to the deployment of machines to the network manager. A rate limit calculator is implemented in the master DNPA instance, in some embodiments. The master DNPA then distributes the calculated rate limit for each DNPA instance to the DNPA instance for which it was calculated.

The master DNPA instance, in some embodiments, selects a cluster manager plugin of a particular DNPA instance as a master cluster manager plugin for each of a set of worker node clusters (e.g. compute clusters). The master cluster manager plugin, in some embodiments, is the only cluster manager plugin that communicates with the network manager regarding events related to clusters for which the cluster manager is selected as the master cluster manager plugin. In some embodiments, the master DNPA instance receives data regarding resources available on each of the multiple host computers, and the master cluster manager plugin for each worker node cluster is selected based on the received data regarding the resources available on each of the plurality of host computers.

In some embodiments, each DNPA instance receives notifications and determines whether the notifications relate to either (1) a cluster-level request related to a cluster for which a cluster manager plugin on the same host computer has been designated a master cluster manager plugin or (2) a pod-level request related to a worker node executing on the same host computer. For each notification determined to be related to either (1) a cluster-level request related to a cluster for which a cluster manager plugin on the same host computer has been designated a master cluster manager plugin or (2) a pod-level request related to a worker node executing on the same host computer, the DNPA instance adds a request related to the received notification to a request queue.

The received notifications, in some embodiments, are a set of intent-based API requests that are forwarded from an API processor executing on a master network node. The received set of intent-based API requests is parsed by the DNPA to generate at least one of a first set of cluster-level requests and a second set of pod-level requests to identify at least one of a cluster-level request and a pod-level request to store in the request queue on the host computer. The requests added to the request queue, in some embodiments, are identified as either being cluster-level requests or pod-level requests. The number of cluster-level requests and the number of pod-level requests, in some embodiments, are reported separately to a master DNPA instance. The master DNPA instance, in some embodiments, calculates separate rate limits for cluster-level and pod-level requests for each DNPA instance that are distributed to the DNPA instances.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all of the embodiments described by this document, a full review of the Summary, the Detailed Description, the Drawings, and the Claims is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIGS. 10A-D illustrate a set of operations performed for two clusters that together span three nodes that each execute a DNPA instance of a DNPA.

DETAILED DESCRIPTION

Figure 1:
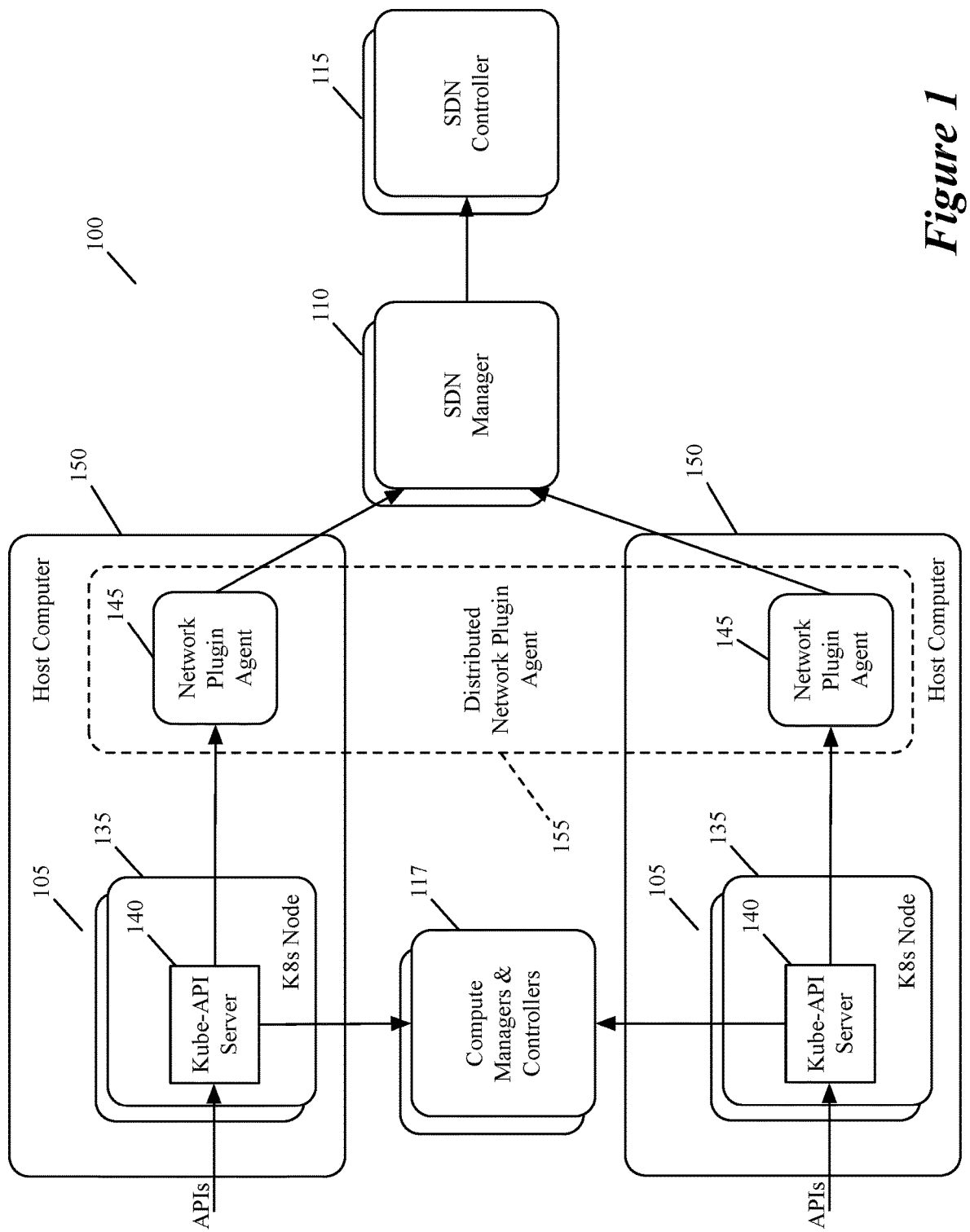
FIG. 1 illustrates an example of a control system of some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for connecting deployed machines in a set of one or more software-defined datacenters (SDDCs) to a virtual private cloud (VPC) in an availability zone (AZ). The method deploys network plugin agents (e.g. listening agents) on multiple host computers and configures the network plugin agents to receive notifications of events related to the deployment of network elements from a set of compute deployment agents executing on the particular deployed network plugin agent's host computer. The method, in some embodiments, is performed by a network manager that receives notifications from the deployed network plugin agents regarding events relating to the deployed machines and, in response to the received notifications, configures network elements to connect one or more sets of the deployed machines. In some embodiments, the network manager is a network manager of a VPC in the AZ.

In some embodiments, configuring the network plugin agents to receive notifications includes registering the network plugin agents with an API (Application Programming Interface) processor that receives intent-based API requests, and parses these API requests to identify (1) a set of machines to deploy and/or modify in the set of machines, (2) a set of network elements to connect to the set of machines, or (3) a set of service machines to perform services for the set of machines. In some embodiments, the API is a hierarchical document that can specify multiple different compute and/or network elements at different levels of a compute and/or network element hierarchy.

In some embodiments, the APIs define a cluster of nodes (e.g., a Kubernetes worker node cluster) that includes a set of components that represent a control plane for the cluster and a set of (worker) nodes. In some embodiments, the nodes are host computers that host components of the Kubernetes clusters. The host computers of the cluster, in some embodiments, are physical machines, virtual machines, or a combination of both. The host computers (i.e., nodes) execute a set of Pods that, in some embodiments, include a set of containers. In some embodiments, a Kubernetes worker node executes an agent that ensures that containers are running within Pods (e.g., a kubelet), a container runtime that is responsible for running containers, and a network proxy (e.g., a kube-proxy). A cluster, in some embodiments, is partitioned into a set of namespaces into which different Pods or containers are deployed.

A network control system, in some embodiments, performs automated processes to define a VPC to connect the set of machines to a logical network that segregates these machines from other machines in the datacenter. In some embodiments, the set of machines include virtual machines (VMs) and container Pods, the VPC is defined with a supervisor cluster namespace, and the API requests are provided as YAML files. In some embodiments, the deployed logical networks are Kubernetes-based logical networks that define VPCs for corporate entities in one or more datacenters. In some embodiments, the VPC is a "supervisor" Kubernetes cluster with a namespace that provides the tenancy boundary for the entity. These embodiments use Custom Resource Definitions (CRDs) to define additional networking constructs and policies that complement the Kubernetes native resources. The network control system is described in further detail in U.S. patent application Ser. No. 16/897,652, filed Jun. 10, 2020, now published as U.S. Patent Publication 2021/0314239, which is incorporated herein by reference.

In some embodiments, the logical network for a VPC connects a deployed set of machines to each other. For instance, in some embodiments, the logical network includes one or more logical forwarding elements, such as logical switches, routers, gateways, etc. In some embodiments, the method defines a logical forwarding element (LFE) by configuring several physical forwarding elements (PFEs), some or all of which execute on host computers along with the deployed machines (e.g., VMs and Pods). The PFEs, in some embodiments, are configured to implement two or more LFEs to connect two or more different subsets of deployed machines.

One of ordinary skill will realize that other embodiments define other types of networks for other types of entities, such as other business entities, non-profit organizations, educational entities, etc. In some of these other embodiments, neither Kubernetes nor Kubernetes-based Pods are used. For instance, some embodiments are used to deploy networks for only VMs and/or non-Kubernetes containers/Pods.

As used in this document, data messages refer to a collection of bits in a particular format sent across a network. One of ordinary skill in the art will recognize that the term data message is used in this document to refer to various formatted collections of bits that are sent across a network. The formatting of these bits can be specified by standardized protocols or non-standardized protocols. Examples of data messages following standardized protocols include Ethernet frames, IP packets, TCP segments, UDP datagrams, etc. Also, as used in this document, references to L2, L3, L4, and L7 layers (or layer 2, layer 3, layer 4, and layer 7) are references, respectively, to the second data link layer, the third network layer, the fourth transport layer, and the seventh application layer of the OSI (Open System Interconnection) layer model.

FIG. 1 illustrates an example of a control system 100 of some embodiments of the invention. This system 100 processes APIs that use the Kubernetes-based declarative model to describe the desired state of (1) the machines to deploy, and (2) the connectivity, security and service operations that are to be performed for the deployed machines (e.g., private and public IP addresses connectivity, load balancing, security policies, etc.). To process these APIs, the control system 100 uses one or more CRDs that define attributes of custom-specified network resources that are referred to by the received API requests. The system 100 performs automated processes to deploy a logical network that connects the deployed machines and segregates these machines from other machines in the datacenter. The machines are connected to the deployed logical network of a VPC in some embodiments.

As shown, the control system 100 includes an API processing cluster 105, a software-defined network (SDN) manager cluster 110, an SDN controller cluster 115, and compute managers and controllers 117. The API processing cluster 105 includes two or more API processing nodes 135, with each node comprising an API processing server 140. The API processing servers 140 (e.g., a compute deployment agent) communicate directly with a network plugin agent (NPA) 145 that executes on a host computer 150, or communicates indirectly with the NPA 145 through an agent executing on the Kubernetes node 135. The NPAs 145 are, in some embodiments, part of a distributed NPA 155. The API processing server 140 receives intent-based API calls and parses these calls. In some embodiments, the received API calls are in a declarative, hierarchical Kubernetes format, and may contain multiple different requests. The API calls, in some embodiments, are received from a system administrator, a cluster user, or are generated by an automated script.

The API processing server 140 parses each received intent-based API request into one or more individual requests. When the requests relate to the deployment of machines, the API server 140 provides these requests directly to the compute managers and controllers 117, or indirectly provides these requests to the compute managers and controllers 117 through an agent running on the Kubernetes master node 135. The compute managers and controllers 117 then deploy VMs (e.g., Kubernetes worker nodes) and/or Pods on host computers in the availability zone.

The API calls can also include requests that require network elements to be deployed. In some embodiments, these requests explicitly identify the network elements to deploy, while in other embodiments the requests can also implicitly identify these network elements by requesting the deployment of compute constructs (e.g., compute clusters, containers, etc.) for which network elements have to be defined by default. As further described below, the control system 100 uses the NPAs 145 to identify the network elements that need to be deployed and to direct the deployment of these network elements.

NPA 145 is the interface between the API server 140 and the SDN manager cluster 110 that manages the network elements that serve as the forwarding elements (e.g., switches, routers, bridges, etc.) and service elements (e.g., firewalls, load balancers, etc.) in an availability zone. The SDN manager cluster 110 directs the SDN controller cluster 115 to configure the network elements to implement the desired forwarding elements and/or service elements (e.g., logical forwarding elements and logical service elements) of one or more logical networks. As further described below, the SDN controller cluster 115 interacts with local controllers on host computers and edge gateways to configure the network elements in some embodiments.

In some embodiments, the NPA 145 registers for event notifications with the API server 140, e.g., sets up a long-pull session with the API server 140 to receive all CRUD events for various CRDs that are defined for networking. In some embodiments, the API server 140 is a Kubernetes master VM, and the NPA 145 runs on a host computer 150 on which the Kubernetes master VM executes. NPA 145, in some embodiments, collects realization data from the SDN resources for the CRDs and provides this realization data as it relates to the CRD status. In some embodiments, each Kubernetes master VM monitors other worker nodes in the Kubernetes worker node cluster to detect failures of components of the Kubernetes worker node clusters. When a Kubernetes master VM detects a failure, in some embodiments, the Kubernetes master VM generates a request to deploy a replacement for the failed component.

In some embodiments, NPA 145 processes the parsed API requests relating to deployed machines in the network, to direct the SDN manager cluster 110 to implement (1) virtual interfaces (VIFs) needed to connect VMs and Pods to forwarding elements on host computers, (2) virtual networks to implement different segments of a logical network of the VPC, (3) load balancers to distribute the traffic load to endpoint machines, (4) firewalls to implement security and admin policies, and (5) exposed ports to access services provided by a set of machines in the VPC to machines outside and inside of the VPC. Details of implementing the different components can be found in U.S. patent application Ser. No. 16/897,652.

The API server 140, in some embodiments, provides the CRDs that have been defined for extended network constructs to the NPA 145 for it to process the APIs that refer to the corresponding network constructs. The API server 140 also provides configuration data from a configuration storage to the NPA 145. The configuration data, in some embodiments, includes parameters that adjust pre-defined template rules that the NPA 145 follows to perform its automated processes. The NPA 145 performs these automated processes to execute the received API requests in order to direct the SDN manager cluster 110 to deploy or configure the network elements for the VPC. For a received API, the control system 100 performs one or more automated processes to identify and deploy one or more network elements that are used to implement the logical network for a VPC. The control system 100 performs these automated processes without an administrator performing any action to direct the identification and deployment of the network elements after an API request is received.

The SDN managers 110 and controllers 115 can be any SDN managers and controllers available today. In some embodiments, these managers and controllers are the NSX-T managers and controllers licensed by VMware, Inc.

In such embodiments, the NPA 145 detects network events by processing the data supplied by its corresponding API server 140, and uses NSX-T APIs to direct the NSX-T manager 110 to deploy and/or modify NSX-T network constructs needed to implement the network state expressed by the API calls. The communication between the NPA 145 and NSX-T manager 110 is an asynchronous communication, in which the NPA 145 provides the desired state to NSX-T managers 110, which then relay the desired state to the NSX-T controllers 115 to compute and disseminate the state asynchronously to the host computer, forwarding elements, and service nodes in the availability zone (i.e., to the SDDC set controlled by the controllers 115).

Figure 2:
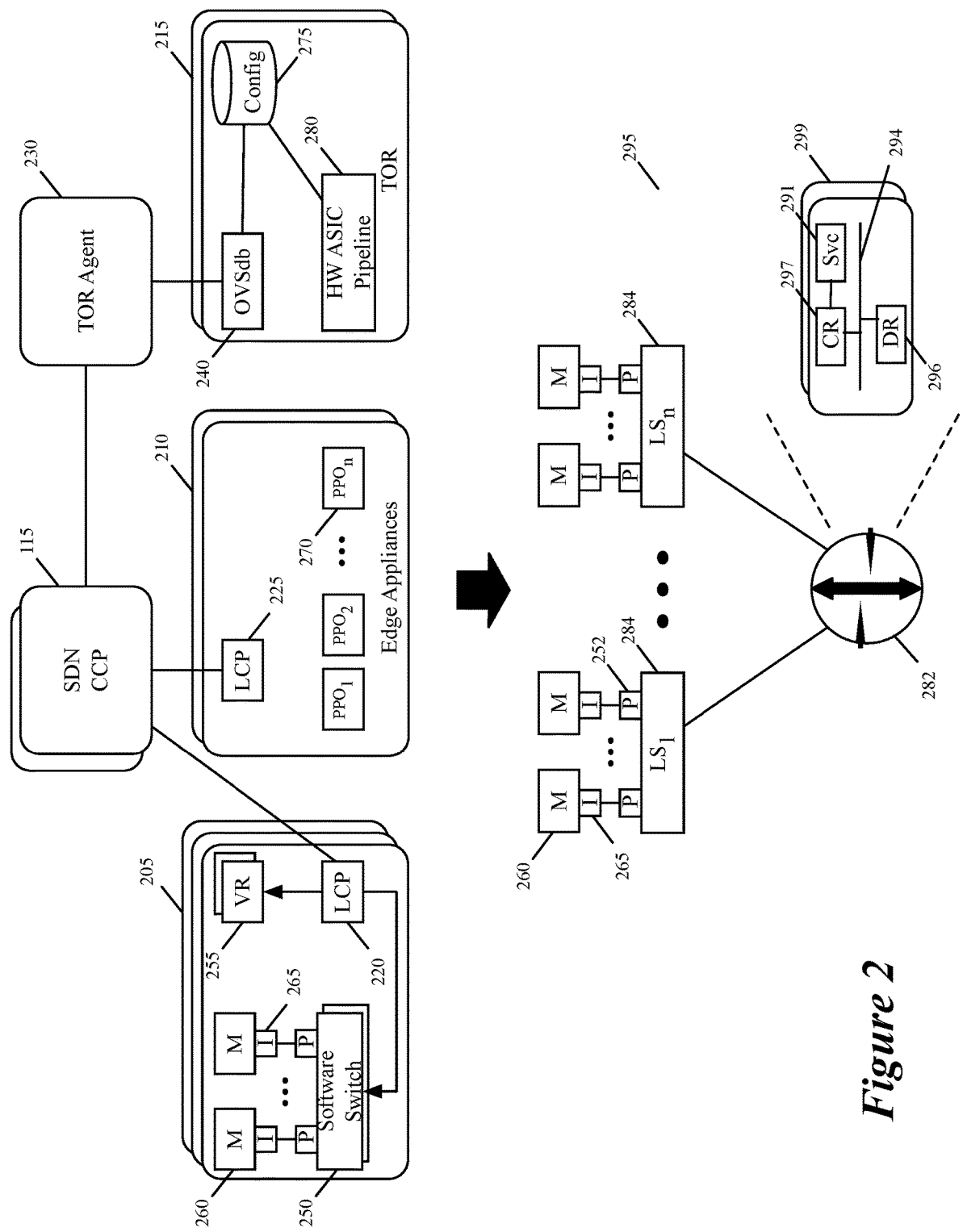
FIG. 2 illustrates an example of a logical network that defines a VPC for one entity, such as one corporation in a multi-tenant public datacenter, or one department of one corporation in a private datacenter.

After receiving the APIs from the NPAs 145, the SDN managers 110 in some embodiments direct the SDN controllers 115 to configure the network elements to implement the network state expressed by the API calls. In some embodiments, the SDN controllers 115 serve as the central control plane (CCP) of the control system 100. FIG. 2 depicts the SDN controllers 115 acting as the CCP computing high-level configuration data (e.g., port configuration, policies, forwarding tables, service tables, etc.). In such capacity, the SDN controllers 115 push the high-level configuration data to the local control plane (LCP) agents 220 on host computers 205, LCP agents 225 on edge appliances 210, and TOR (top-of-rack) agents 230 of TOR switches 215.

Based on the received configuration data, the LCP agents 220 on the host computers 205 configure one or more software switches 250 and software routers 255 to implement distributed logical switches, routers, bridges and/or service nodes (e.g., service VMs or hypervisor service engines) of one or more logical networks with the corresponding switches and routers on other host computers 205, edge appliances 210, and TOR switches 215. On the edge appliances 210, the LCP agents 225 configure packet processing stages 270 of these appliances to implement the logical switches, routers, bridges, and/or service nodes of one or more logical networks along with the corresponding switches and routers on other host computers 205, edge appliances 210, and TOR switches 215.

For the TOR switches 215, the TOR agent 230 configures one or more configuration tables 275 of TOR switches 215 through an OVSdb server 240. The data in the configuration tables 275 then is used to configure the hardware ASIC packet-processing pipelines 280 to perform the desired forwarding operations to implement the desired logical switching, routing, bridging and service operations. U.S. Pat. Nos. 10,554,484, 10,250,553, 9,847,938, and 9,178,833 describe CCPs, LCPs, and TOR agents in more detail, and are incorporated herein by reference.

After the host computers 205 are configured along with the edge appliances 210 and/or TOR switches 215, they can implement one or more logical networks, with each logical network segregating the machines and network traffic of the entity for which it is deployed from the machines and network traffic of other entities in the same availability zone. FIG. 2 further illustrates an example of a logical network 295 that defines a VPC for one entity, such as one corporation in a multi-tenant public datacenter, or one department of one corporation in a private datacenter.

As shown, the logical network 295 includes multiple logical switches 284, with each logical switch 284 connecting different sets of machines and serving as a different network segment. Each logical switch 284 has a port 252 that connects with (i.e., is associated with) a virtual interface 265 of a machine 260. The machines 260, in some embodiments, include VMs and Pods, with each Pod having one or more containers.

The logical network 295 also includes a logical router 282 that connects the different network segments defined by the different logical switches 284. In some embodiments, the logical router 282 serves as a gateway for the deployed VPC in FIG. 2. In some embodiments, the logical router 282 includes distributed routing components 296 and centralized routing components 297. The distributed routing components 296 in some embodiments are implemented by the routing instances that execute on the host computers 205 and edge appliances 210, while the centralized routing components 297 are implemented by the edge appliances 210. Each centralized routing component 297 performs one or more services 291, or are associated with one or more middlebox service nodes that perform one or more services. As such, the centralized routing components 297 are referred to as service routers in some embodiments.

In some embodiments, the centralized and distributed routing components 296 and 297 connect through a logical switch 294 defined on the host computers 205 and the edge appliances 210. Also, in some embodiments, the logical router 282 is implemented by a pair of logical nodes 299, with each node having centralized and distributed components. The pair of nodes 299 can be configured to perform in active/active or active/standby modes in some embodiments. U.S. Pat. No. 9,787,605 describes the gateway implementation of some embodiments in more detail and is incorporated herein by reference.

Figure 3:
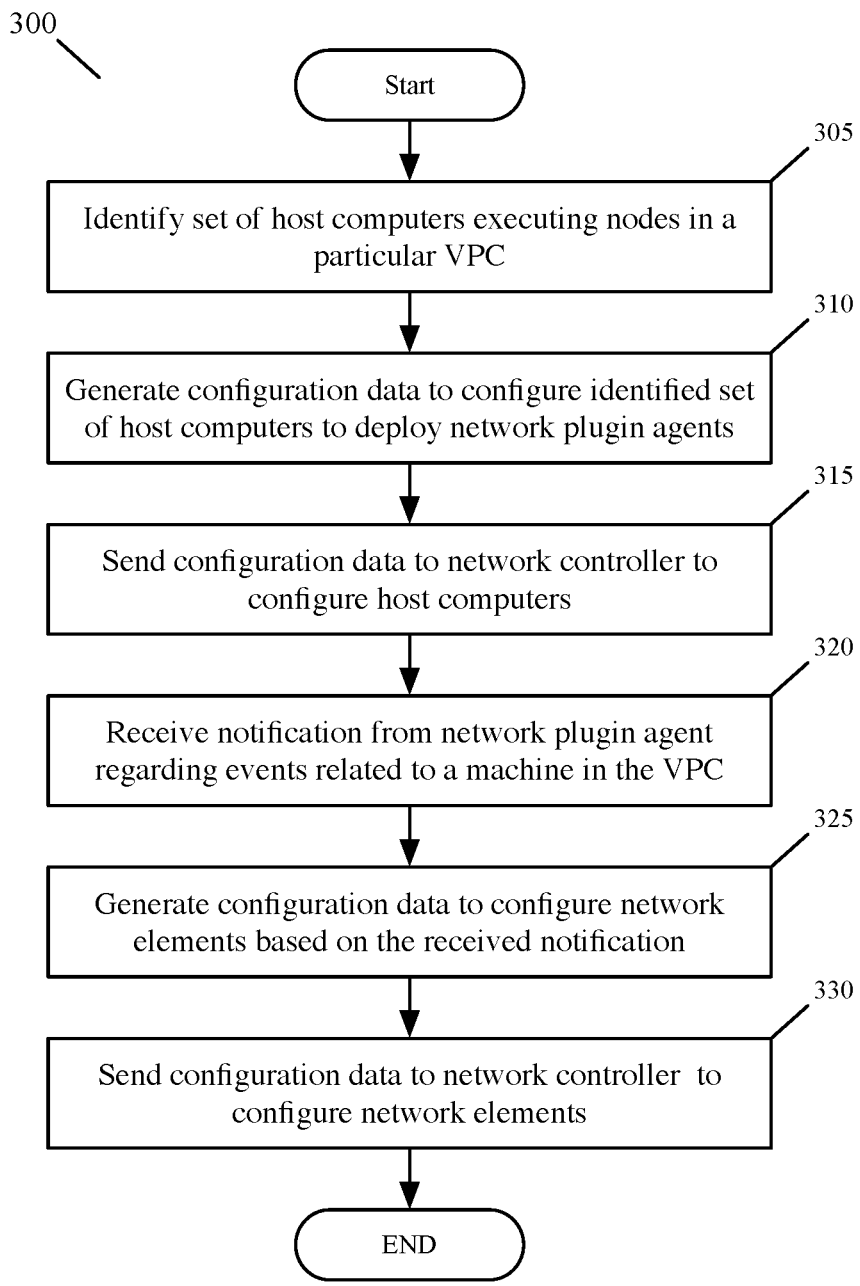
FIG. 3 conceptually illustrates a process for deploying NPAs on a set of host computers hosting nodes of a VPC.

FIG. 3 conceptually illustrates a process 300 for deploying NPAs on a set of host computers hosting nodes of a VPC. In some embodiments, the process 300 is performed by a set of network managers (e.g., SDN managers 110). The process begins by identifying (at 305) a set of host computers hosting nodes (or other components) of a VPC. In some embodiments, the identification is performed as part of executing an instruction to implement a new VPC received at the network manager.

After identifying (at 305) the set of host computers hosting components of the VPC, the process 300 generates (at 310) configuration data to configure the identified set of host computers to deploy NPAs to receive notifications of events from a set of compute deployment agents (e.g., API servers 140) executing on the particular deployed NPA's host computer. In some embodiments, the configuration data includes a specification for a logical network (sometimes referred to as a hyperbus) used for communication between the compute deployment agents and the NPA. The hyperbus, in some embodiments, spans a single host computer, while in other embodiments the hyperbus (e.g., the logical network) spans multiple host computers and enables communication between compute deployment agents executing on one host computer to communicate with NPAs deployed on each of the multiple host computers. In some embodiments, the configuration data includes data for registering the NPA with a set of compute deployment agents connected to a same logical network (e.g., hyperbus) to initiate a long-pull operation to receive notifications of events related to the VPC. In some embodiments, registering the NPA is done by registering a listening agent of the NPA such as listening plugin 485 described in FIG. 4 below.

The generated configuration data is then sent (at 315) to the network controller (e.g., SDN controllers 115) to configure the host computers to deploy the NPAs. In some embodiments, the NPAs are instances of a distributed NPA (DNPA) that together implement the DNPA (e.g., DNPA 155). After the NPAs are deployed, the process 300 receives (at 320) a notification from at least one deployed NPA regarding an event related to at least one machine in the VPC. The notification, in some embodiments, relates to at least one of a request to add, remove, or modify a machine in the VPC that requires an update to network elements of the VPC. In some embodiments, the notification is a request made to the network manager (e.g., SDN manager 110) to direct the network manager to implement (1) virtual interfaces (VIFs) needed to connect VMs and Pods to forwarding elements on host computers, (2) virtual networks to implement different segments of a logical network of the VPC, (3) load balancers to distribute the traffic load to endpoint machines, (4) firewalls to implement security and admin policies, and (5) exposed ports to access services provided by a set of machines in the VPC to machines outside and inside of the VPC.

Figure 4:
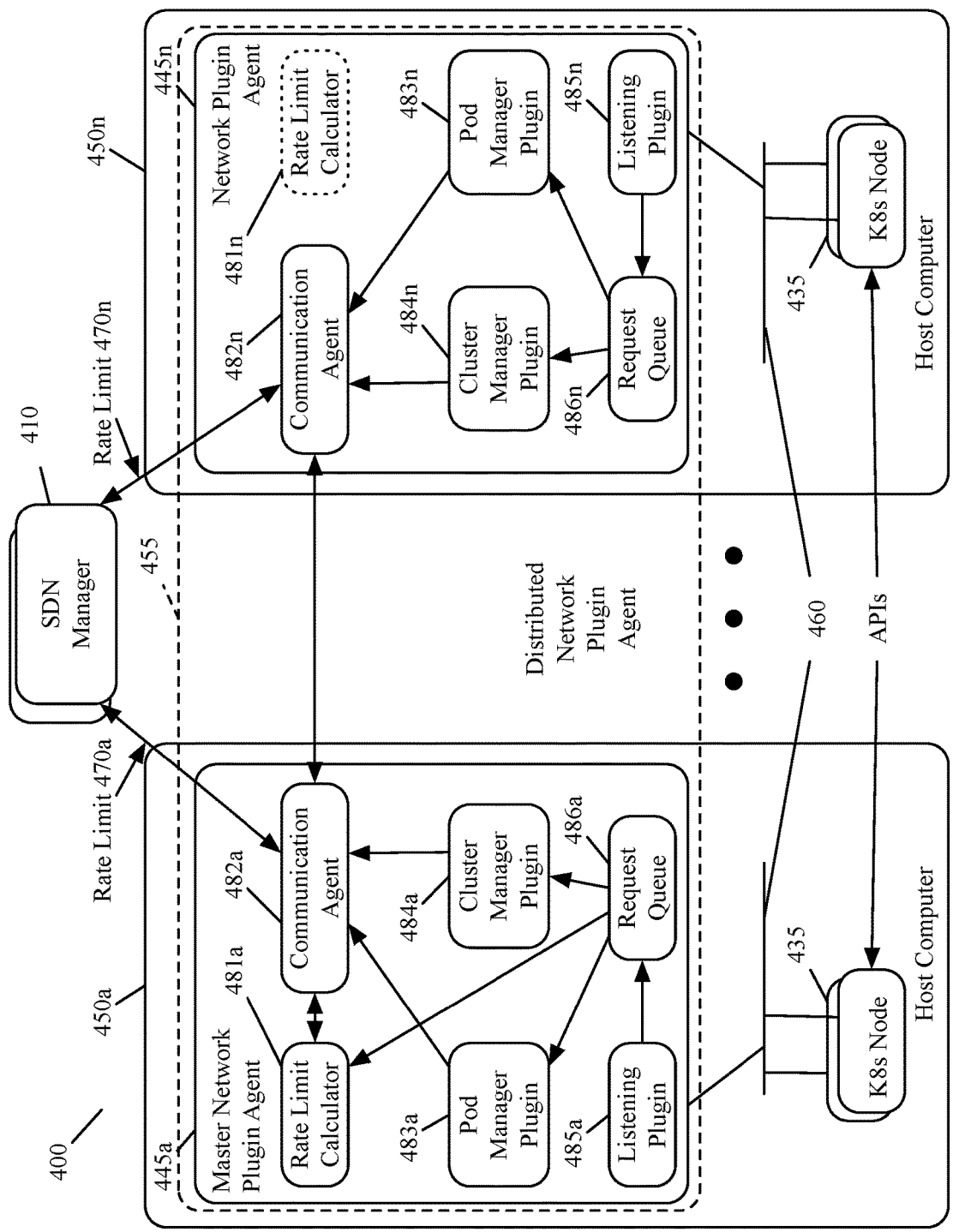
FIG. 4 illustrates a system of host computers after configuration according to the process of FIG. 3.

The process 300 then generates (at 325) configuration data to configure the network elements based on the received notification. After generating (at 325) the configuration data, the generated configuration data is sent (at 330) to a network controller to configure the network elements of the VPC. After sending the configuration data to the network controller, the process 300 ends. FIG. 4 illustrates a system 400 of host computers 450*a-n* after configuration according to process 300. The set of host computers 450*a-n* execute DNPA instances 445*a-n* that together implement a DNPA 455 in an AZ. The components of FIG. 4 will be discussed in relation to FIGS. 5, 7, and 8 which describe processes performed by a DNPA.

Figure 5:
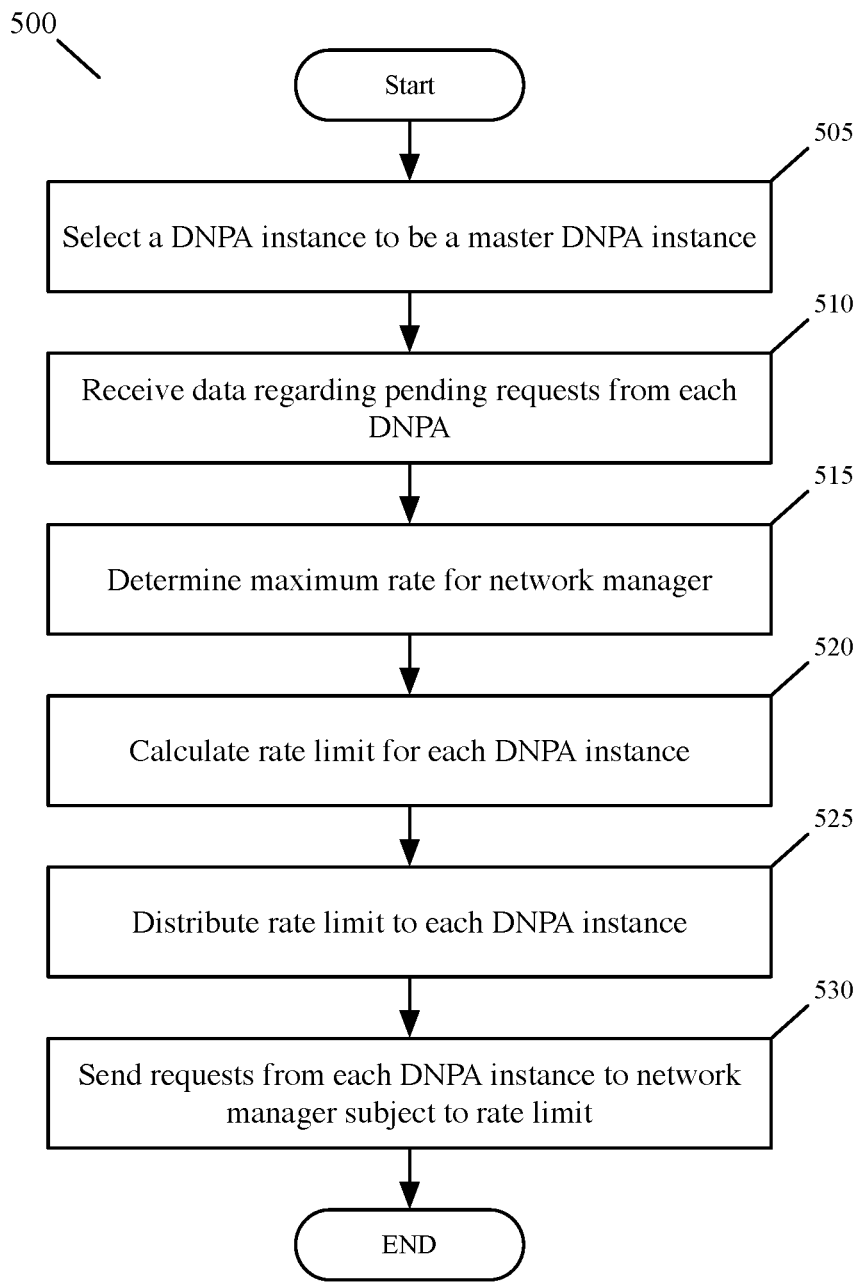
FIG. 5 conceptually illustrates a process for a DNPA to control a rate at which the DNPA provides notifications to the network managers.

FIG. 5 conceptually illustrates a process 500 for a DNPA to control a rate at which the DNPA (i.e., the DNPA instances that together implement the DNPA) provides notifications (e.g., makes requests) to the network managers. In some embodiments, one DNPA instance executes on each of multiple host computers to replace multiple network agents executing on each host computer for a set of multiple clusters that independently provide notifications to the network managers. This rate limiting, in some embodiments, avoids a situation in which the independent network agents overwhelm the network managers and cause a network manager to fail. The process 500, in some embodiments, is performed by the DNPA.

Process 500 begins, after DNPA instances are deployed as described in relation to process 300, by selecting (at 505) a master DNPA instance. The master DNPA instance, in some embodiments, is selected based on resources available at the host computers on which the DNPA instances are deployed. The selected master DNPA (e.g., DNPA instance 445*a*) instance then receives (at 510) data from each DNPA instance (including itself) regarding pending requests at each DNPA instance. In some embodiments, the data is received over a specific network (e.g., logical switch, VLAN, etc.) that is created for communication between DNPA instances. The master DNPA aggregates the received data regarding the pending requests to determine a total number of pending requests. The data is aggregated, in some embodiments, by a rate limit calculator (e.g., rate limit calculator 481*a*) of the master DNPA instance. In some embodiments, the pending requests are identified as either being associated with cluster-level events (e.g., events relating to namespaces, logical networks within a cluster, load balancers, network policies, etc.) or pod-level requests. In some embodiments, communication agents 482*a* receive pending request data from pod manager plugin 483*a* and cluster manager plugin 484*a*, while in other embodiments, the request queue 486*a* communicates directly with the communication agent 482*a* to identify the number of pending requests.

In addition to receiving (at 510) the data regarding pending requests, the DNPA also determines (at 515) a maximum rate for providing notifications to the network manager (e.g., SDN manager 410). In some embodiments, the maximum rate is configured at the deployment of the DNPA and may be updated as network conditions change. The maximum rate, in some embodiments, is based on a number of DNPAs deployed for different VPCs. Based on the number of pending requests associated with each DNPA instance and the maximum rate for providing notifications from the DNPA, the master DNPA instance calculates (e.g., using rate limit calculator 481*a*) (at 520) a rate limit 470 for each DNPA instance to communicate with the network manager. In some embodiments, the rate limit calculator is inactive in all the other DNPA instances.

In some embodiments, the master DNPA instance calculates separate rate limits for cluster-level and pod-level notifications for each DNPA instance. In some embodiments, the rate limit for a particular DNPA instance is calculated based on the number of pending requests associated with the DNPA instance and the total number of pending requests. For example, a rate limit calculated for a particular DNPA would be the maximum rate allowed at the network manager multiplied by the number of pending requests associated with the DNPA instance and divided by the total number of pending requests associated with the DNPA (e.g., all the DNPA instances).

The calculated rate limits 470*a-n* are then distributed (at 525) to the DNPA instances through communication agents (e.g., communication agents 482*a-n*) to be used to limit the rate at which the DNPA notifies the network managers of events relating to machines in the VPC that require configuration of network elements. The DNPA (e.g., instances of the DNPA) then sends (at 530) requests to the network manager to update the network elements to account for the event notifications received at the DNPA subject to the calculated rate limit. In some embodiments, the communication agent of each DNPA instance enforces the rate limit when communicating with the SDN manager 410. The operations 510-530, in some embodiments, are performed periodically to ensure that the request queues are processed based on a current size of the request queue instead of a historical size of the request queue.

Figure 6:
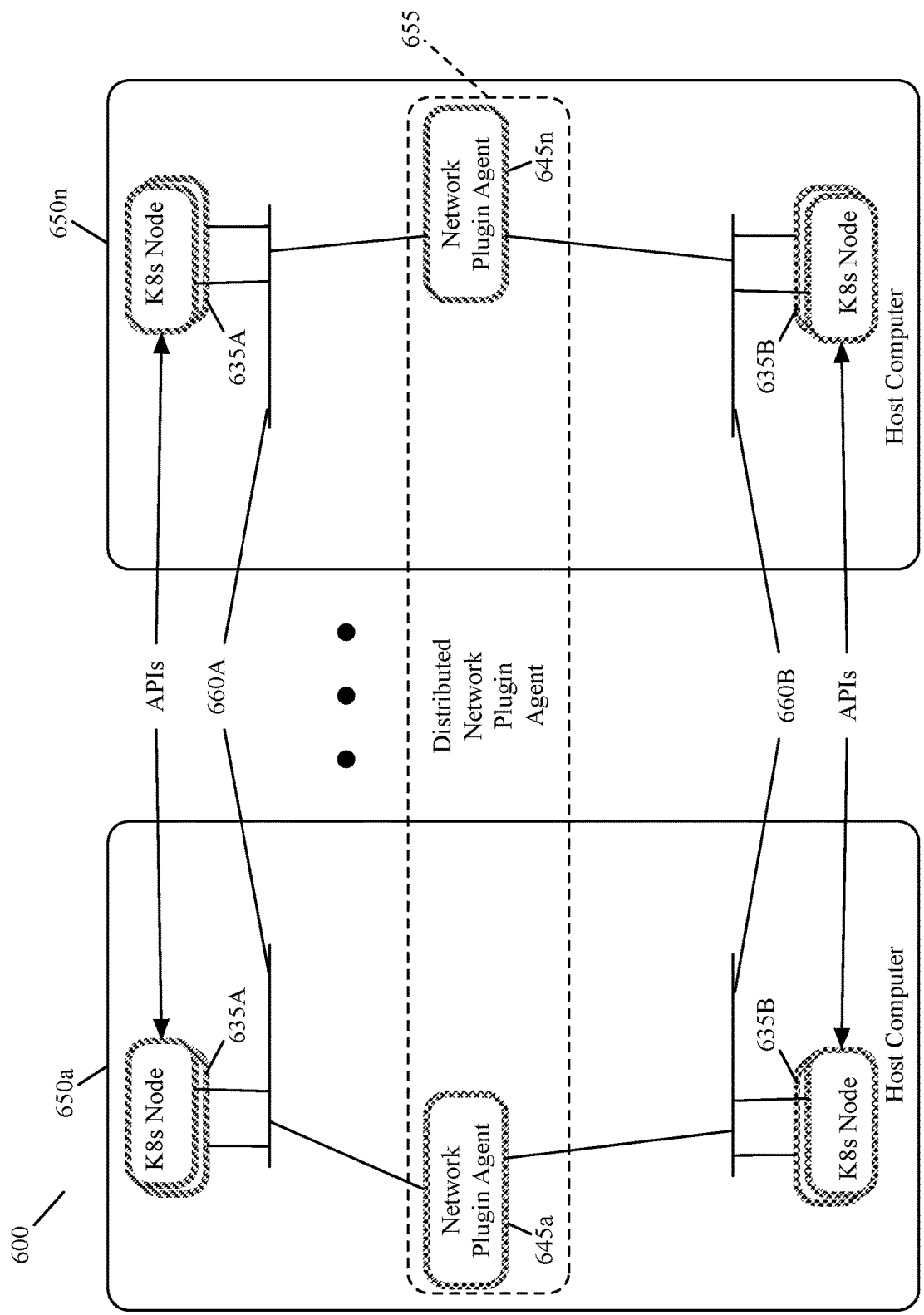
FIG. 6 illustrates an embodiment in which host computers implement a single DNPA selecting DNPA master instances for clusters of different entities.

In some embodiments, the DNPA supports clusters of different tenants or VPCs and receives notifications from compute deployment agents from the nodes in the different VPCs or belonging to different tenants and communicates with different SDN manager clusters. FIG. 6 illustrates an embodiment in which host computers implement a single DNPA selecting DNPA master instances for clusters of different entities. Each DNPA instance in the illustrated embodiment includes the components illustrated in FIG. 4 and communicates with a network manager (not shown). DNPA instances for DNPA 655 include DNPA instances 645*a*-645*n*. DNPA instance 645*n* is selected as the master DNPA instance for the Kubernetes nodes 635A and DNPA instance 645*a* is selected as the master DNPA instance for the Kubernetes nodes 635B. In some embodiments, the sets of DNPA instances connected to Kubernetes nodes 635A and 635B include different DNPA instances that execute on different sets of host computers. In other embodiments, the number of instances connected to Kubernetes nodes 635A and 635B are the same, but the sets of host computers on which they execute are different. Additionally, different logical networks 660A and 660B for connecting the worker nodes and the DNPA instances of the different VPCs or tenants are implemented similarly to logical network 460 of FIG. 4.

In some embodiments, the DNPA instances implement multiple DNPAs for different tenants or VPCs and receive notifications from compute deployment agents from the worker nodes in the different VPCs or belonging to different tenants. The number of DNPA instances for the different DNPAs, in some embodiments, are independent and execute on independent sets of host computers (i.e., the numbers and identities of the DNPA instances may be the same or different). Additionally, different logical networks for connecting the worker nodes and the DNPA instances of the different VPCs or tenants are implemented similarly to logical network 460 of FIG. 4. In some embodiments, the different DNPAs are deployed for different SDN manager clusters such that for each SDN manager cluster there is only one DNPA implemented by a set of host computers hosting components related to the SDN manager cluster. Such embodiments reduce the number of components sending requests to a particular SDN manager cluster and avoid overloading the SDN manger cluster as described above.

Figure 7:
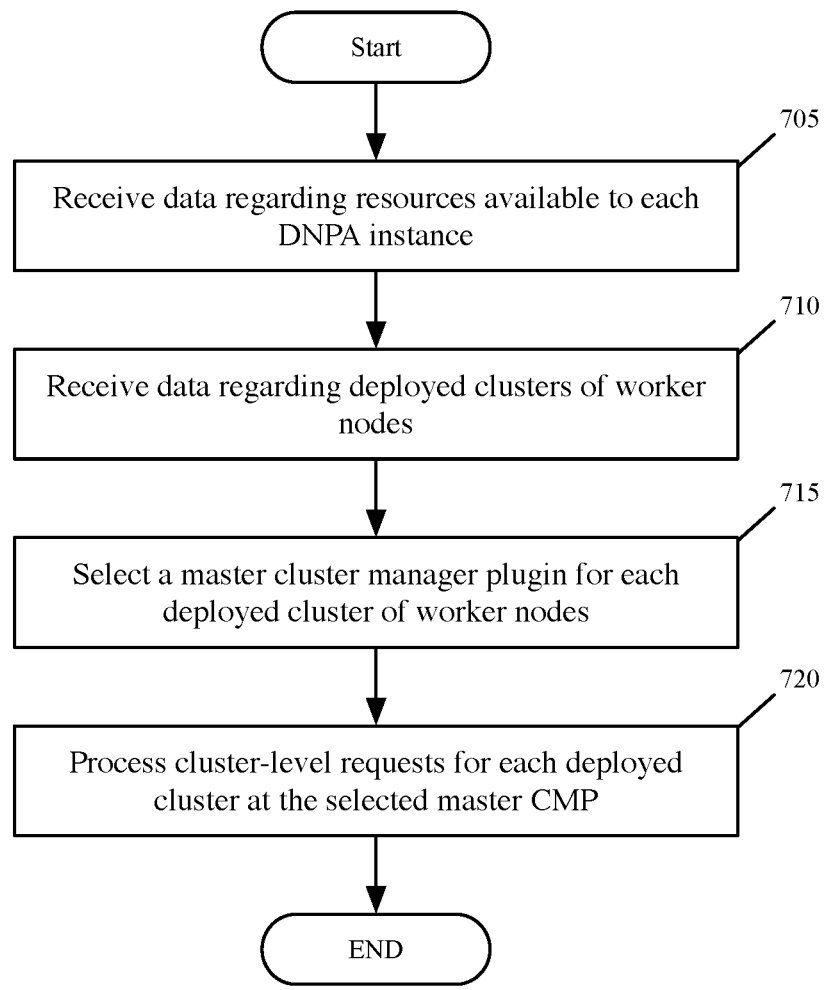
FIG. 7 conceptually illustrates a process for the DNPA to perform to select a master CMP for a set of deployed clusters of worker nodes associated with the DNPA and to process cluster-level requests at the selected master CMP.

FIG. 7 conceptually illustrates a process 700 for the DNPA to perform to select a master cluster manager plugin (CMP) for a set of deployed clusters of worker nodes associated with the DNPA and to process cluster-level requests at the selected master CMP. Process 700 begins by receiving (at 705) data regarding resources available to each DNPA instance. In some embodiments, the data is data regarding resources available to each CMP on the DNPA instances. The data is received, in some embodiments, based on a request from the master DNPA instance.

In addition to receiving (at 705) data regarding the resources available to each DNPA instances, the master DNPA instance receives (at 710) data regarding deployed clusters of worker nodes. The data, in some embodiments, includes the number of deployed clusters. In some embodiments, the data includes data that identifies the clusters for which each host computer executes a worker node (e.g., host 1 executes worker nodes for clusters 1, 4, and 7). The data regarding the resources and the deployed clusters, in some embodiments, is received in a different order.

Based on the received data regarding the resources available to each DNPA instance and the number of clusters, the DNPA (e.g., the master DNPA instance) selects (at 715) a master cluster manager plugin (CMP) to process events related to each cluster. In some embodiments, different CMPs 484 of different DNPA instances 445 are selected as masters for multiple clusters, single clusters, and no clusters. The CMPs selected as master CMPs for each cluster then process (at 720) cluster-level requests for the clusters for which they are selected as the master CMP. Cluster-level requests include, in some embodiments, requests to add, remove, or modify (1) a namespace of a cluster, (2) a service (e.g. load balancing and firewall) associated with the cluster, (3) a logical network associated with the cluster, and (4) a set of network policies for the cluster. In some embodiments, no master pod manager plugin (PMP) is selected, as each PMP is responsible for communicating requests relating to pods executing on a same host computer.

Figure 8:
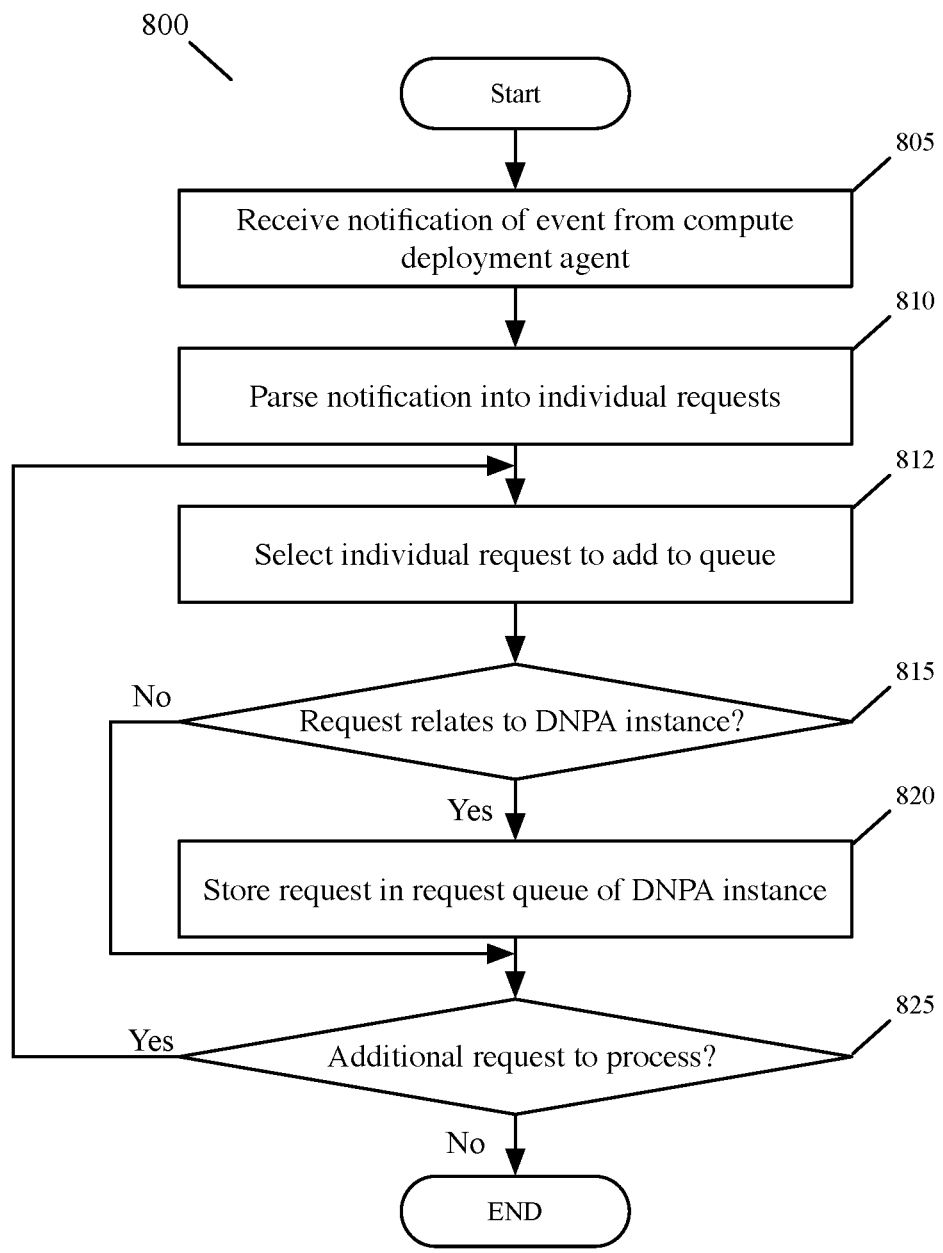
FIG. 8 conceptually illustrates a process for parsing and queueing a received notification at a DNPA instance.

FIG. 8 conceptually illustrates a process 800 for parsing and queueing a received notification at a DNPA instance. Process 800 begins by receiving (at 805) a notification of an event from a compute deployment agent. In some embodiments, the notification is received from a compute deployment agent (e.g., in a worker node 435) executing on a same host computer over a hyperbus of the host computer. The notifications, in some embodiments, are CRUD requests received from worker nodes (i.e., not only master worker nodes) that are being configured to execute components of the cluster in the VPC. The notification of the event is received (at 805) at the listening plugin 485 based on a prior registration of the listening plugin 485 with the nodes 435 (e.g., API servers of the nodes 435). In some embodiments, the registration is a long-pull session with the API server to receive all CRUD events for various CRDs that are defined for networking.

As shown each set of Kubernetes nodes 435 executing on a host computer 450*a-n* communicates over a switch 460. In some embodiments, the switch 460 is a logical switch implemented by a PFE on the host computer. The switch 460, in some embodiments, is a hyperbus that connects machines executing on a single host computer, but does not connect to machines executing on other host computers. Logical switch 460, in some embodiments, is a single logical switch that connects the Kubernetes nodes 435 to each network plugin agent (e.g., the listening plugins of the DNPA instances). In some embodiments using a single logical switch, only Kubernetes master nodes (i.e., compute deployment agents) connect to the logical switch 460 to provide notifications of APIs received at the master nodes. In other embodiments, the notification is received from a compute deployment agent (e.g., a master worker node) executing on a different host computer. Notifications from compute deployment agents executing on other host computers are received over a logical network that connects the compute deployment agents and the DNPA instances (e.g., the listening plugins of the DNPA instances).

After receiving (at 805) the notification, the notification is parsed (at 810) to identify a set of individual requests relating to cluster-level and pod-level events that require configuring the network elements. In some embodiments, the notification is an intent-based API that is parsed into a set of events based on a set of custom resource definitions. Parsing the notifications, in some embodiments, includes parsing CRUD requests received from worker nodes executing on a same host computer as the listening plugin of the DNPA instances.

After parsing (at 810) the notification to identify the cluster-level and pod-level requests, the process 800 selects (at 812) an individual request to process in the identified cluster-level and pod-level requests. The process 800 then determines (at 815) whether the selected request relates to the DNPA instance that received the notification. In some embodiments, the parsing and determining are performed by a listening plugin 485. A parsed request, in some embodiments, relates to the DNPA instance if the request (1) relates to a cluster for which a CMP of the DNPA instance is a master CMP or (2) relates to a pod on the host computer of the DNPA instance to be created, removed, or modified.

If the process 800 determines that the selected request does not relate to the DNPA instance (e.g., if the pod-level request is not related to the host computer, or the cluster-level request is for a cluster for which a CMP of the DNPA instance is not a master CMP), the process 800 proceeds to determine (at 825) if there is an additional request to potentially store in the queue. If the selected request is determined (at 815) to be related to the DNPA instance that received the notification, the DNPA instance stores (at 820) the request to a request queue 486 of the DNPA. In some embodiments, the request queue (e.g., a request queue 486) is a separate memory structure of the host computer that is accessed by the plugins of the DNPA instance. The requests determined to be related to the DNPA instance, in some embodiments, are those requests that the CMP and PMP (e.g., CMP 484*a* and PMP 483*a*) of the DNPA instance are responsible for communicating to the network manager (e.g., SDN manager 410).

After a selected request is stored (at 820), the process 800 determines (at 825) whether there is an additional request to potentially store in the queue. If the process 800 determines (at 825) that there is an additional request to process, the process 800 returns to operation 812 to select a next request to process. However, if the process 800 determines (at 825) that there is no additional request to process, the process 800 ends. In some embodiments, after parsing the notification (at 810) all identified requests are added to the queue and the filtering operations described in operations 812-825 are performed at a Pod manager plugin or cluster manager plugin that retrieves requests from the request queue and filters the retrieved requests to ignore requests that are not relevant to the DNPA instance.

Figure 9:
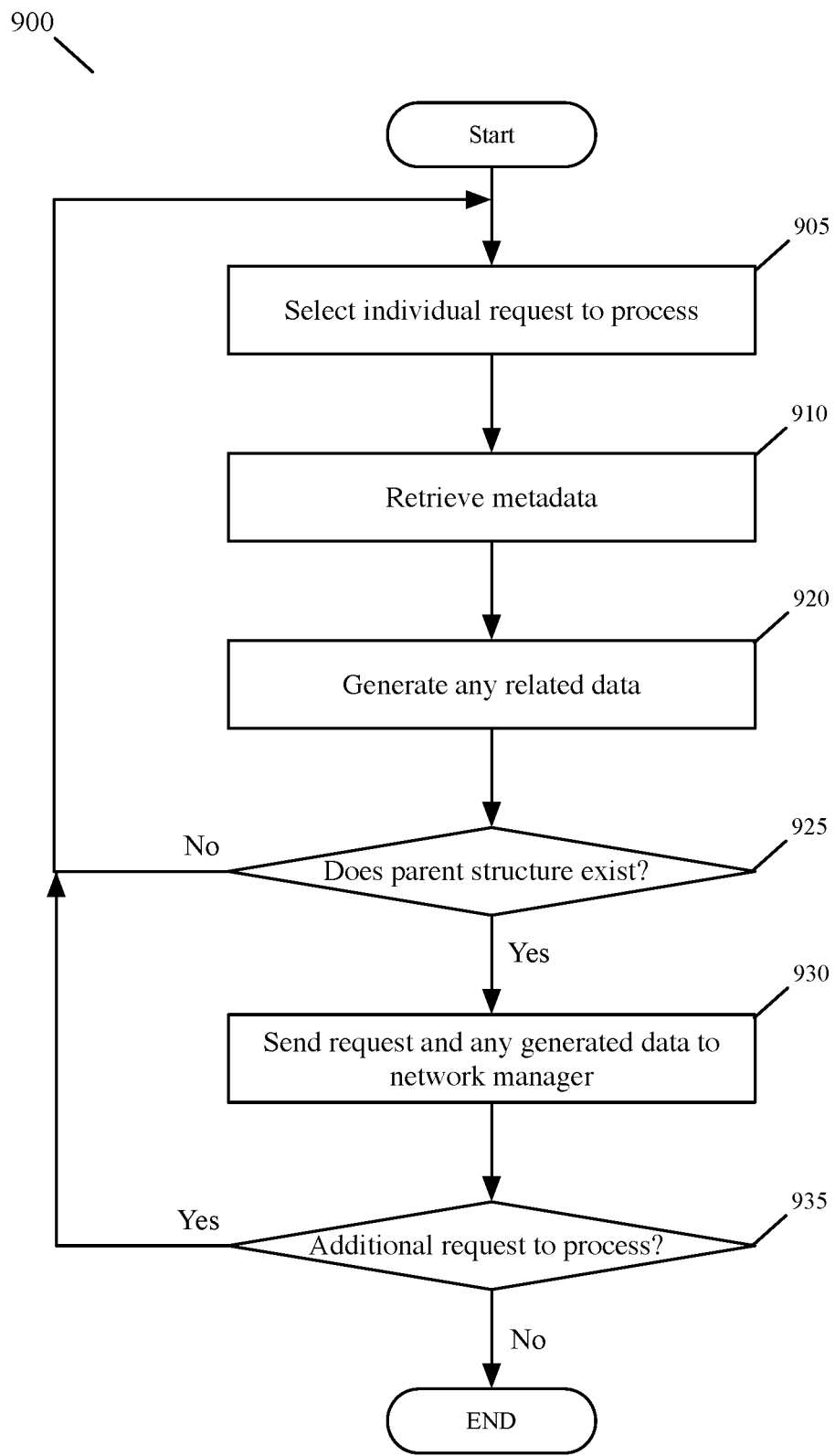
FIG. 9 conceptually illustrates a process for processing queued requests at a DNPA instance.

FIG. 9 conceptually illustrates a process 900 for processing queued requests at a DNPA instance. In some embodiments, the process is performed by both a Pod manager plugin (e.g., PMP 483) and a cluster manager plugin (e.g., CMP 484) to process pod-level and cluster-level requests, respectively. Process 900 begins by selecting (at 905) a request in the request queue (e.g. request queue 486) to process for communication to a network manager (e.g., SDN manager 410). After selecting (at 905) a request to process, the process 900 retrieves (at 910) metadata associated with the selected request. In some embodiments, retrieving the metadata includes retrieving at least a portion of the metadata from the request queue. Additional metadata, in some embodiments, is retrieved from a worker or master node of a cluster related to the request. In some embodiments, the determination as to whether the request relates to the DNPA instance described in relation to operation 815 of process 800 is, instead, performed as part of process 900 and process 900 only proceeds to the next operation if the request relates to the DNPA instance.

After retrieving (at 910) the metadata, the process 900 generates (at 920) data related to the request to provide to the network manager to implement the requested network (cluster) components. For cluster-level requests, generating the related data includes identifying, at a cluster manager plugin, network elements that are affected by the cluster-level request. For example, a request to implement a load balancer or firewall requires a generation of data identifying Pods, containers, and/or machines for which to provide the load balancing, or generating firewall rules based on firewall policies (e.g., policies specifying endpoint groups that are resolved by the cluster manager plugin into individual port identifiers). For Pod-level requests, in some embodiments, the generated data includes at least one port identifier for a requested Pod-level construct. In some embodiments, a Pod-level request does not require generating additional data.

After any related data is generated (at 920), the process 900 determines (at 925) whether the parent structures or components required to process the request exist. For example, in some embodiments, the parent structure for a namespace is a cluster and a parent structure for a pod is a namespace. One of ordinary skill in the art will appreciate that different requests in different embodiments will require different parent structures in a hierarchical network structure and that some non-hierarchical structures will skip this determination. If the process determines (at 925) that the parent structure does not exist, the process 900 returns to operation 905 to select an individual request to process. If the request for which the parent structure did not exist is the only unprocessed request, the process 900 will attempt to process the request again. In some embodiments, the process 900 attempts to process the request periodically, or registers for a notification of the creation of the required structure or component.

If the process 900 determines (at 925) that the required structures or components exist, the request, the retrieved metadata, and any generated data are sent (at 930) to the network manager (e.g., by the CMP 484 or PMP 483 using communication agent 482). In some embodiments, the metadata and/or the generated data are appended to the request to send it to the network manager. After sending (at 930) the request and associated data to the network manager, the process 900 determines (at 935) whether there are additional requests to process. If there are no additional requests to process, the process 900 ends. In some embodiments, when the process ends, the process 900 is placed in a waiting/listening mode and begins again upon the next request being added to the request queue by a listening plugin. If there are additional requests to process in the request queue, the process 900 returns to operation 905 to select an individual request in the request queue and the process continues as described above.

The process 900, in some embodiments, is limited to processing and sending requests at a rate that does not exceed the rate limit calculated by the master DNPA instance and distributed to the DNPA instance. In some embodiments, the requests are sent to the network manager in the order they are received. The cluster-level requests and pod-level requests, in some embodiments, are processed separately in the order they are received and are each restricted to a rate limit calculated for the particular type of operation. For example, a DNPA instance that has a large number of pending cluster-level requests and a small number of pod-level requests may have a higher rate limit for processing cluster-level requests than it has for processing pod-level requests, or vice versa.

FIGS. 10A-D illustrate a set of operations performed for two clusters that together span three nodes (e.g., host computers) 1060a-c that each execute a DNPA instance with DNPA instance DNPA1 executing on Node 1 being the master (active) DNPA instance for the DNPA. Each DNPA instance includes a listener plugin "LA" (columns 1020a-c), a cluster manager plugin "CMP" (columns 1030a-c), and a Pod manager plugin "PMP" (columns 1050a-c). FIGS. 10A-D include columns 1030a-c for actions taken by the DNPA instances 1-3 on behalf of the DNPA.

FIG. 10A illustrates a set of operations taken at times T0-T2 (1011-1013) in response to a request to deploy worker nodes 1 and 2 (WN1 and WN2) on nodes 1 and 3, respectively, for "cluster-1" which, in this example, is the first request for cluster-1. At T0 1011, each listening agent on a node 1060 that is to deploy a WN receives the event. Based on receiving the event, the DNPA instance that is the master DNPA instance for the DNPA (i.e., DNPA1 1030a) determines a master CMP for cluster-1 (i.e., CMP1 1040a) at time T1 1012. After selecting a master CMP for cluster-1, DNPA1 sends a broadcast message to all the other DNPA instances to inform them of the selected master CMP for cluster-1 at time T2 1013. The actual deployment is handled, for example, by the compute manager and controller 117 in some embodiments. CMP1 1040a, in some embodiments, then communicates the deployment of the WNs to the SDN manager to connect to the network.

FIG. 10B similarly illustrates a set of operations taken at times T3-T5 (1014-1016) in response to a request to deploy worker nodes (WNs) on nodes 2 and 3 for "cluster-2" which, in this example, is the first request for cluster-2. At T3 1014, each listening agent on a node 1060 that is to deploy a WN receives the event. Based on receiving the event, the DNPA instance that is the master DNPA instance for the DNPA (i.e., DNPA1 1030a) determines a master CMP for cluster-2 (i.e., CMP3 1040c) at time T4 1015. After selecting a master CMP for cluster-2, DNPA1 sends a broadcast message to all the other DNPA instances to inform them of the selected master CMP for cluster-2 at time T5 1016. As illustrated in FIGS. 10A and B, different master CMPs are selected for different clusters. The actual deployment is handled, for example, by the compute manager and controller 117 in some embodiments. CMP3 1040c, in some embodiments, then communicates the deployment of the WNs to the SDN manager to connect to the network.

FIG. 10C illustrates a set of operations taken at times T6 1017 and T7 1018 in response to a request to deploy a namespace (NS) for cluster-1. At T6 1017, each listening agent 1020 on a node 1060 that executes a component of cluster-1 (i.e., LA1 1020a of node 1 1060a and LA3 1020c of node 3 1060c) receives the event. Based on receiving the event, the LA 1020 determines that the event (i.e., adding a namespace) is a cluster-level event and determines if the CMP executing on the same node 1060 is the master for the corresponding cluster. If the LA 1020 determines that the CMP executing on the same node 1060 is the master for the corresponding cluster, the LA 1020 adds the request to a queue (e.g., LA1 1020a adds the request to the queue of the DNPA instance 1030a). If, however, the LA 1020 determines that the CMP executing on the same node 1060 is not the master for the corresponding cluster, the LA 1020 ignores (rejects) the request and does not add it to the queue (e.g., LA3 1020c rejects the request and does not add the request to the queue of the DNPA instance 1030c). The CMP that is the master of the cluster (e.g., CMP1 1040a) then processes the cluster-level request to add a namespace at T7 1018.

FIG. 10D illustrates a set of operations taken at times T8 1019a and T9 1019b in response to a request to deploy Pod 1 and Pod 2 for "cluster-1" on WNs 1 and 2. At T8 1019a, each listening agent 1020 on a node 1060 that is to deploy a Pod receives the event (i.e., LA1 1020a of node 1 1060a receives the request to add "POD1" and LA3 1020c of node 3 1060c receives the request to add "POD2"). Based on receiving the event, the LA 1020 determines that the event (i.e., adding a Pod) is a Pod-level event and adds the request to the queue of the DNPA instance 1030 executing on the same node (e.g., host computer). At T9 1019b, the PMP 1050 processes the request to add the Pod to the WN.

Figure 11:
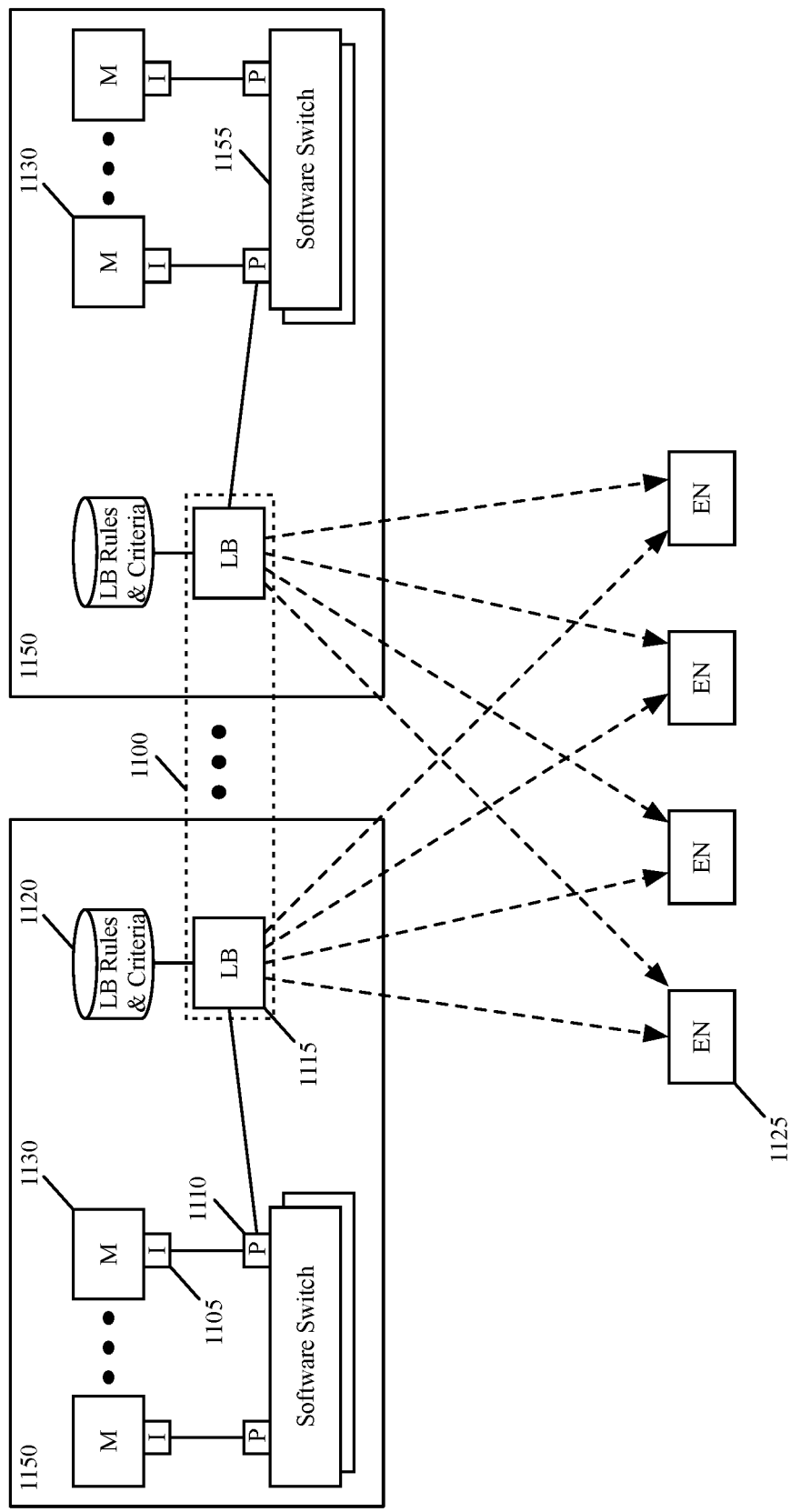
FIG. 11 illustrates an example of a distributed load balancer that the control system defines for several VIF-associated machines on several host computers in some embodiments.
Figure 12:
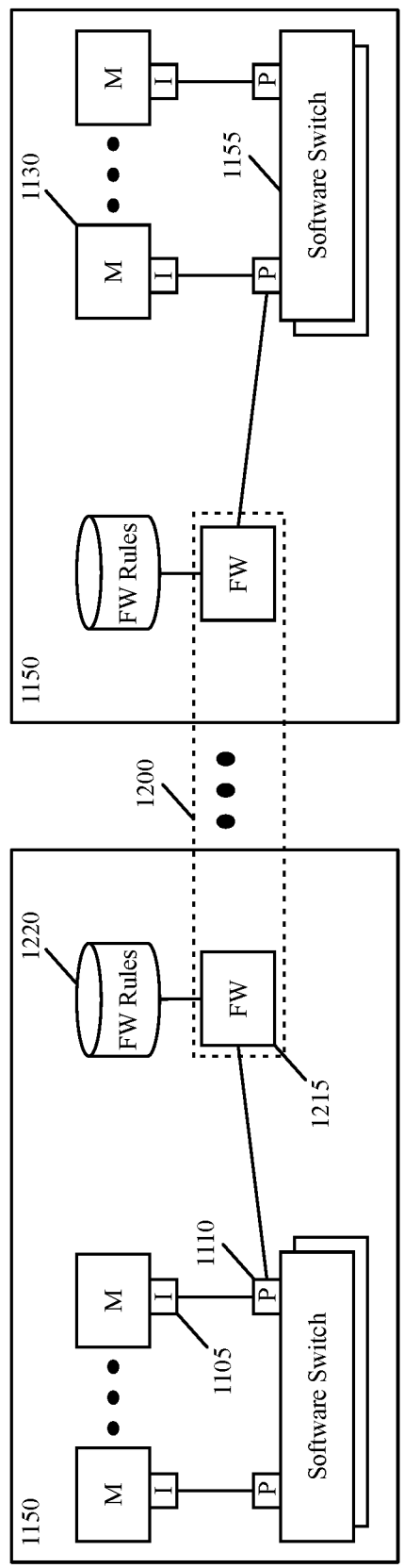
FIG. 12 illustrates an example of a distributed firewall that the control system defines for several VIF-associated machines on several host computers in some embodiments.

FIGS. 11 and 12 illustrate two network services that may require configuration data to be generated at the network manager and/or network controller based on a detected event relating to a machine in a VPC in order to provide the service for the machine. FIG. 11 illustrates an example of a distributed load balancer 1100 that the NPA defines for several VIF-associated machines 1130 on several host computers 1150 in some embodiments. At the behest of the NPA, the SDN managers/controllers in some embodiments configure the software switch ports 1110 to which the VIFs 1105 connect (i.e., with which the VIFs are associated) with hooks to load balancers 1115 executing on the same host computers as the VIFs 1105. In some embodiments, one load balancer 1115 is instantiated for each VIF 1105 that needs associated client-side load balancing operations. Each load balancer 1115, in some embodiments, is a service engine provided by a hypervisor executing on the same computer as the machines 1130.

The hooks are configured to direct to their respective load balancers ingress and/or egress traffic entering or exiting (provided by or provided to) the VIF-associated machines 1130. Each load balancer 1115 uses a set of load balancing rules (stored in an LB rule storage 1120) to identify the set of end nodes 1125 that should process data message flows entering or exiting the machines 1130. In some embodiments, the load balancer 1115 then uses load balancing criteria (e.g., weight values for round robin selection of end nodes 1125) to select an end node 1125 for each data message flow, and then forwards one or more data messages of a flow to the end node 1125 selected for that flow. As shown, the load balancing rules and criteria are stored in the LB rule storage 1120 in some embodiments.

This selection of the load balancer 1115 for a data message flow can be stateful, in some embodiments, so that all the data messages of one flow are sent to one end node 1125. Alternatively, this selection can be stateless, in some embodiments, so that different data messages of the same flow are sent to different end nodes 1125. Also, in some embodiments, the load balancer 1115 can be configured to only send the first data message or first few data messages of a flow to the end node machines 1125.

The end nodes 1125 in some embodiments can be service nodes in case of ingress or egress traffic, or destination compute nodes in case of egress traffic. The end nodes 1125 can be engines/machines on the same host computer 1150 as the client VIF-associated machines 1130 and the load balancers 1115, can be engines/machines on different host computers, or can be standalone appliances. In some embodiments, the end nodes 1125 are associated with a virtual network address (e.g., a VIP address) or a set of associated network addresses (e.g., a set of associated IP addresses). In some embodiments, the end nodes machines 1125 are Pods, VMs, and/or containers executing on Pods/VMs.

When forwarding data messages to end node machines 1125 residing on the same host computer, a load balancer 1115 forwards the data messages through a software switch 1155 on its host computer 1150 in some embodiments. Alternatively, when forwarding data messages to end node machines 1125 not residing on the same host computer, the load balancer 1115 forwards the data messages through its host's software switch 1155 and/or software routers (not shown) and intervening network fabric.

The NPA in some embodiments directs the SDN managers/controllers to configure hooks in the VIF-associated ports 1110 for other middlebox service operations, such as firewall, intrusion detection, intrusion prevention, deep packet inspection, encryption, etc. FIG. 12 illustrates an example where the port hooks are configured to direct ingress/egress data message flows from/to a VIF-associated machine 1130 to a firewall engine 1215 on the same host computer 1150 that performs firewall operations on these flows. The firewall operations in some embodiments determine whether the data message flows should be allowed to pass through to the machine or software switch, should be dropped, or should be redirected to another service machine or appliance.

As shown, several firewall engines 1215 on several host computers 1150 implement a distributed firewall 1200. In some embodiments, multiple such firewall engines 1215 execute on the same host computer 1150 for multiple different VIF-associated machines 1130 for which distributed firewall operations are configured. To perform their firewall operations, the firewall engines 1215 use firewall rules stored in a firewall rule storage 1220. The firewall rules are defined by the SDN managers/controllers at the behest of the NPA in some embodiments. In some embodiments, the NPA defines the distributed firewall operations to implement Network Policies services defined in Kubernetes APIs, as well as other firewall operations described in this document.

As discussed in more detail in U.S. patent application Ser. No. 16/897,652, the control system 100 in some embodiments can configure the service and forwarding rules to have the VIF-associated machines 1130 perform service- or server-end operations. To facilitate the use of VIF-associated machines 1130 as service machines or server machines, some embodiments use Endpoint Group CRDs.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
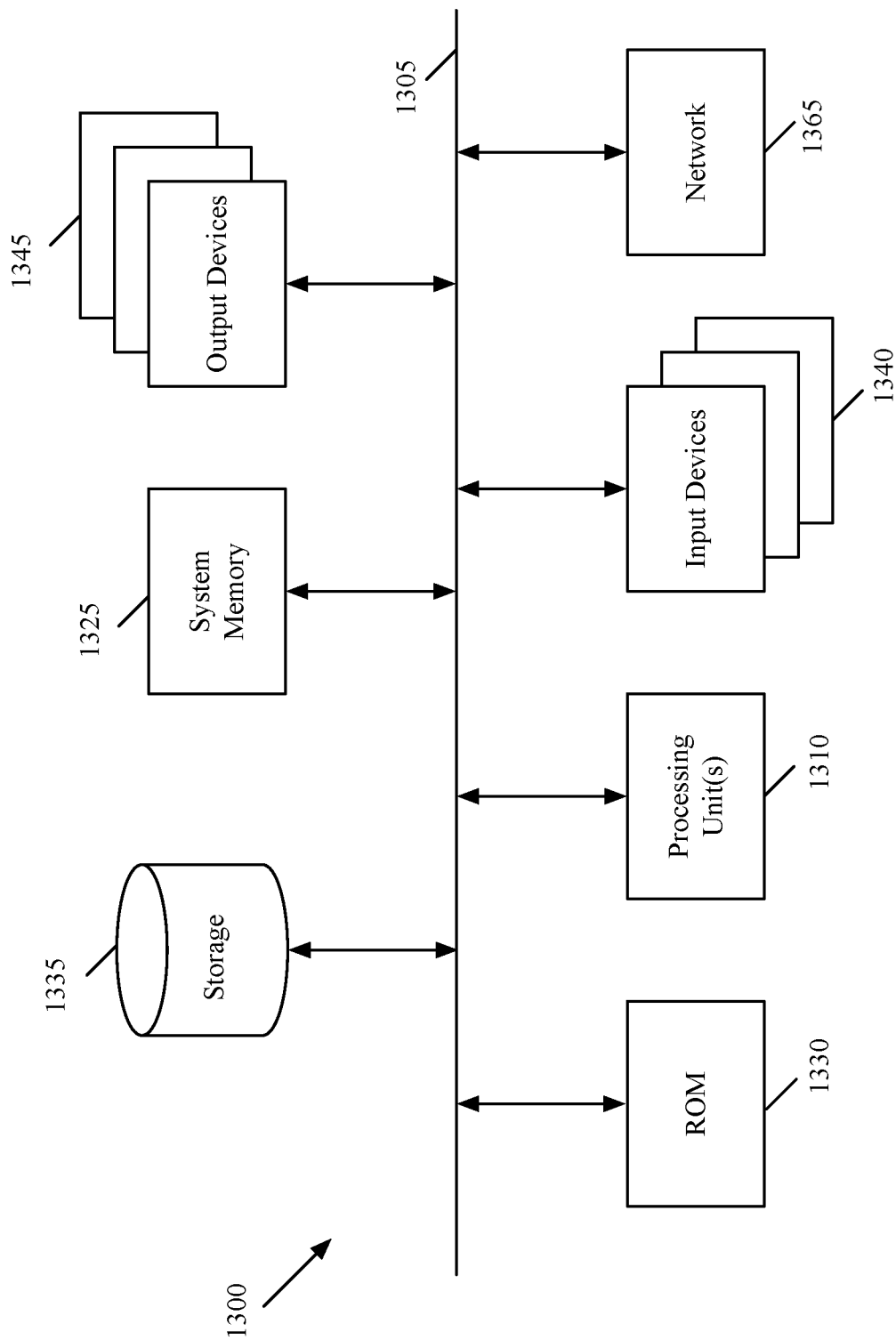
FIG. 13 conceptually illustrates a computer system with which some embodiments of the invention are implemented.

FIG. 13 conceptually illustrates a computer system 1300 with which some embodiments of the invention are implemented. The computer system 1300 can be used to implement any of the above-described hosts, controllers, and managers. As such, it can be used to execute any of the above described processes. This computer system includes various types of non-transitory machine readable media and interfaces for various other types of machine readable media. Computer system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the computer system 1300. For instance, the bus 1305 communicatively connects the processing unit(s) 1310 with the read-only memory 1330, the system memory 1325, and the permanent storage device 1335.

From these various memory units, the processing unit(s) 1310 retrieve instructions to execute and data to process in order to execute the processes of the invention. The processing unit(s) may be a single processor or a multi-core processor in different embodiments. The read-only-memory (ROM) 1330 stores static data and instructions that are needed by the processing unit(s) 1310 and other modules of the computer system. The permanent storage device 1335, on the other hand, is a read-and-write memory device. This device is a non-volatile memory unit that stores instructions and data even when the computer system 1300 is off. Some embodiments of the invention use a mass-storage device (such as a magnetic or optical disk and its corresponding disk drive) as the permanent storage device 1335.

Other embodiments use a removable storage device (such as a floppy disk, flash drive, etc.) as the permanent storage device 1335. Like the permanent storage device 1335, the system memory 1325 is a read-and-write memory device. However, unlike storage device 1335, the system memory 1325 is a volatile read-and-write memory, such as random access memory. The system memory 1325 stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieve instructions to execute and data to process in order to execute the processes of some embodiments.

The bus 1305 also connects to the input and output devices 1340 and 1345. The input devices 1340 enable the user to communicate information and select requests to the computer system. The input devices 1340 include alphanumeric keyboards and pointing devices (also called "cursor control devices"). The output devices 1345 display images generated by the computer system. The output devices 1345 include printers and display devices, such as cathode ray tubes (CRT) or liquid crystal displays (LCD). Some embodiments include devices such as touchscreens that function as both input and output devices.

Finally, as shown in FIG. 13, bus 1305 also couples computer system 1300 to a network 1365 through a network adapter (not shown). In this manner, the computer can be a part of a network of computers (such as a local area network ("LAN"), a wide area network ("WAN"), or an Intranet), or a network of networks (such as the Internet). Any or all components of computer system 1300 may be used in conjunction with the invention.

Some embodiments include electronic components, such as microprocessors, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Also, while several examples above refer to container Pods, other embodiments use containers outside of Pods. Thus, one of ordinary skill in the art would understand that the invention is not to be limited by the foregoing illustrative details, but rather is to be defined by the appended claims.

We claim:

1. A method for connecting deployed machines to a virtual private cloud (VPC) in an availability zone (AZ):

deploying a plurality of network plugin agents, which are different instances of a distributed network plugin agent (DNPA), on a plurality of host computers executing a plurality of machines that are deployed by a plurality of compute deployment agents, each network plugin agent comprising a request queue, a cluster manager plugin, a pod manager plugin, and a communication agent;

configuring each particular deployed network plugin agent to receive notifications of events from a set of compute deployment agents executing on the particular deployed network plugin agent's host computer;

receiving notifications from the deployed network plugin agents regarding events relating to the deployed machines; and in response to the received notifications, configuring network elements to connect one or more sets of the deployed machines, said configuring each particular network plugin agent comprising configuring each particular network plugin agent's (i) request queue to store requests related to notifications received by the network plugin agent, (ii) cluster manager plugin to process requests relating to cluster-level requests stored in the request queue, wherein a cluster-level request is a request relating to a worker node cluster in a plurality of worker node clusters executing on the plurality of host computers, (iii) pod manager plugin to process requests related to pod-level requests relating to worker nodes executing on the host computer that are stored in the request queue, and (iv) communication agent to communicate requests processed by the cluster manager plugin and pod manager M in to a network manager that configures the network elements in the availability zone based on the requests processed by the cluster manager plugin and the pod manager plugin.

2. The method of claim 1, wherein configuring network elements to connect one or more sets of the deployed machines comprises directing a network controller to configure the network elements to connect the one or more sets of the deployed machines.

3. The method of claim 1, wherein configuring each particular deployed network plugin agent to receive notifications of events from a set of compute deployment agents comprises registering the particular network plugin agent with a set of application programming interface (API) processors of the set of compute deployment agents executing on the particular deployed network plugin agent's host computer that receives requests to deploy machines.

4. The method of claim 3, wherein the compute deployment agent is a master worker node of a Kubernetes worker node cluster that receives requests to modify a set of machines in the Kubernetes worker node cluster.

5. The method of claim 4, wherein the request to modify the set of machines in the Kubernetes cluster comprises at least one of (1) a request to add a machine in the set of machines, (2) a request to remove a machine in the set of machines, and (3) a request to modify a deployed machine, the set of machines comprising at least one of a container, and a pod that requires a connection to the VPC.

6. The method of claim 5, wherein configuring network elements to connect one or more sets of the deployed machines comprises (1) assigning a set of network addresses to the machines in the sets of the deployed machines and (2) updating a set of forwarding elements of the VPC to use at least one network address in the set of network addresses to connect to the sets of the deployed machines.

7. The method of claim 4, wherein a particular master worker node of a particular Kubernetes cluster monitors a set of other worker nodes in the particular Kubernetes cluster and the API processor receives requests based on at least one of the monitoring of the set of other worker nodes and an instruction received from outside the particular Kubernetes cluster.

8. The method of claim 7, wherein a request received at the API processor is based on detecting, at the master worker node of the Kubernetes cluster, that a machine in the Kubernetes cluster has failed and determining that a replacement machine should be deployed, wherein the request received at the API processor is a request to deploy the replacement machine.

9. The method of claim 1, wherein:
one DNPA instance in the plurality of DNPA instances executing on the plurality of host computers is designated as a master DNPA instance for the DNPA; and
the master DNPA instance (1) receives data regarding a number of pending requests stored in a request queue associated with a DNPA instance executing on each of the plurality of host computers, (2) determines a maximum rate for processing requests at the network manager, (3) determines the total number of pending requests related to the deployment of machines, (4) calculates, for each DNPA instance in the plurality of DNPA instances, a rate limit specifying a rate at which the DNPA instance is allowed to communicate requests related to the deployment of machines to the network manager, and (5) distributes the rate limit calculated for each particular DNPA instance to the particular DNPA instance.

10. The method of claim 9, wherein the master DNPA instance calculates the rate limit for each particular DNPA instance based on (1) the number of pending requests associated with the particular DNPA instance, (2) the maximum rate for processing requests at the manager, and (3) the total number of pending requests related to the deployment of machines.

11. The method of claim 9, wherein the master DNPA instance selects a cluster manager of a particular DNPA instance to be a master cluster manager plugin for at least one worker node cluster in the plurality of worker node clusters, the master cluster manager plugin of each particular worker node cluster being the only cluster manager plugin to process cluster-level requests related to the particular worker node cluster.

12. The method of claim 11, wherein the master DNPA instance receives data regarding resources available on each of the plurality of host computers, and the master cluster manager plugin for each worker node is selected based on the received data regarding the resources available on each of the plurality of host computers.

13. The method of claim 11, wherein:
the DNPA is associated with a set of Kubernetes clusters comprising worker nodes;
each Kubernetes cluster has a master worker node that receives API requests related to the Kubernetes cluster;
the master worker node of each Kubernetes cluster in the set of Kubernetes clusters connects to a logical network that connects the master worker nodes to network plugin agents deployed on the plurality of host computers; and
each network plugin agent executing on each host computer in the plurality of host computers receives notifications from each master worker node and determines whether to add a related request to a request queue on the same host computer as the network plugin agent based on whether the notification relates to either (1) a cluster-level request related to a cluster for which a cluster manager on the same host computer has been designated a master cluster manager or (2) a pod-level request related to a worker node executing on the same host computer.

14. The method of claim 1, wherein the notification comprises a forwarded intent-based application programming interface (API) request to modify a set of machines received at an API processor, and the network plugin agent parses the forwarded API request to generate at least one of a first set of cluster-level requests and a second set of pod-level requests to identify at least one of a cluster-level request and a pod-level request to store in the request queue on the host computer.

15. The method of claim 1, wherein the notification comprises a forwarded CRUD (Create, Read, Update and Delete) request to modify a set of machines received at a worker node executing on the host computer and the network plugin agent parses the forwarded CRUD request to identify at least one of a cluster-level request and a pod-level request to store in the request queue on the host computer.

16. The method of claim 9, wherein each DNPA instance processes requests stored in a request queue of the host computer on which the DNPA instance executes in an order in which they were stored in the request queue on the host computer at a rate that is no greater than the rate limit received from the master DNPA instance.

17. The method of claim 9, wherein the data regarding a number of pending requests comprises data regarding a number of pending cluster-level requests and a number of pending pod-level requests, the rate limit is a first rate limit specifying a rate at which the DNPA instance is allowed to communicate cluster-level requests related to the deployment of machines to the network manager and the master DNPA instance calculates, for each DNPA instance in the plurality of DNPA instances, a second rate limit specifying a rate at which the DNPA instance is allowed to communicate pod-level requests related to the deployment of machines to the network manager.

18. The method of claim 9, wherein the DNPA is associated with a set of Kubernetes clusters comprising worker nodes and each worker node on a host computer connects to a hyperbus on the host computer that connects the worker nodes to the network plugin agent, wherein notification sent from each worker node to the network plugin agent are sent using the hyperbus.

\* \* \* \* \*